US 8,954,178 B2

(12) United States Patent
Thapa

(10) Patent No.: US 8,954,178 B2
(45) Date of Patent: Feb. 10, 2015

(54) SYNCHRONIZATION AND MIXING OF AUDIO AND VIDEO STREAMS IN NETWORK-BASED VIDEO CONFERENCING CALL SYSTEMS

(75) Inventor: Mukund N. Thapa, Palo Alto, CA (US)

(73) Assignee: Optical Fusion, Inc., Palo Alto, CA (US)

( * ) Notice: Subject to any disclaimer, the term of this patent is extended or adjusted under 35 U.S.C. 154(b) by 416 days.

(21) Appl. No.: 13/304,105

(22) Filed: Nov. 23, 2011

(65) Prior Publication Data

US 2012/0069137 A1    Mar. 22, 2012

Related U.S. Application Data

(63) Continuation-in-part of application No. 12/242,358, filed on Sep. 30, 2008.

(60) Provisional application No. 60/976,464, filed on Sep. 30, 2007, provisional application No. 61/417,106, filed on Nov. 24, 2010.

(51) Int. Cl.
*G06F 17/00* (2006.01)
*H04N 7/15* (2006.01)

(52) U.S. Cl.
CPC . *H04N 7/15* (2013.01); *H04N 7/155* (2013.01)
USPC .......................................................... 700/94

(58) Field of Classification Search
USPC .......................................................... 700/94
See application file for complete search history.

(56) References Cited

U.S. PATENT DOCUMENTS

| | | | |
|---|---|---|---|
| 4,720,850 A | 1/1988 | Oberlander et al. | |
| 5,689,641 A | 11/1997 | Ludwig et al. | |
| 5,854,640 A | 12/1998 | North et al. | |
| 5,973,724 A | 10/1999 | Riddle | |
| 6,288,739 B1 * | 9/2001 | Hales et al. | 348/14.07 |
| 6,354,748 B1 * | 3/2002 | Vrvilo | 709/204 |
| 6,405,255 B1 * | 6/2002 | Stoltz et al. | 709/231 |
| 6,501,717 B1 | 12/2002 | Yamazaki | |
| 6,603,450 B1 | 8/2003 | Yamazaki et al. | |
| 6,795,740 B1 * | 9/2004 | Chu et al. | 700/94 |
| 6,836,295 B1 * | 12/2004 | Cooper | 348/515 |
| 6,906,741 B2 | 6/2005 | Canova et al. | |
| 6,940,855 B2 | 9/2005 | Okamura | |
| 6,972,786 B1 | 12/2005 | Ludwig | |
| 7,084,898 B1 * | 8/2006 | Firestone et al. | 348/14.09 |
| 7,369,699 B1 | 5/2008 | Christie | |
| 7,400,340 B2 * | 7/2008 | Callan et al. | 348/14.02 |
| 7,526,525 B2 * | 4/2009 | Hagale et al. | 709/204 |

(Continued)

FOREIGN PATENT DOCUMENTS

EP    1 465 193    10/2004

OTHER PUBLICATIONS

Intel Corporation, "High Definition Audio Specification, Revision 1.0a," Jun. 17, 2010, two hundred twenty-five pages.

(Continued)

*Primary Examiner* — Paul McCord
(74) *Attorney, Agent, or Firm* — Fenwick & West LLP

(57) ABSTRACT

In one aspect, audio streams are added to a mix until the mix is either complete (i.e., all audio streams have been added) or the mix is closed early (i.e., before the mix is complete). In another aspect, audio and video streams are synchronized by playing back the audio stream and then synchronizing display of the video frames to the playback of the audio stream.

21 Claims, 12 Drawing Sheets

(56) References Cited

U.S. PATENT DOCUMENTS

| | | | |
|---|---|---|---|
| 7,592,532 B2 * | 9/2009 | Coleman | 84/603 |
| 7,617,280 B1 | 11/2009 | Webster et al. | |
| 7,620,410 B2 | 11/2009 | Takizawa et al. | |
| 7,672,742 B2 | 3/2010 | Ng et al. | |
| 8,060,366 B1 | 11/2011 | Maganti et al. | |
| 8,081,205 B2 | 12/2011 | Baird et al. | |
| 8,213,503 B2 | 7/2012 | Tu et al. | |
| 8,214,516 B2 | 7/2012 | Gupta et al. | |
| 8,335,576 B1 | 12/2012 | Bradshaw et al. | |
| 2002/0055796 A1 * | 5/2002 | Katayama et al. | 700/94 |
| 2002/0145610 A1 | 10/2002 | Barilovits et al. | |
| 2003/0035371 A1 | 2/2003 | Reed et al. | |
| 2003/0043260 A1 | 3/2003 | Yap et al. | |
| 2003/0174826 A1 | 9/2003 | Hesse | |
| 2004/0008635 A1 | 1/2004 | Nelson et al. | |
| 2004/0028199 A1 | 2/2004 | Carlson | |
| 2004/0119814 A1 | 6/2004 | Clisham et al. | |
| 2004/0141528 A1 | 7/2004 | LeBlanc et al. | |
| 2004/0258047 A1 | 12/2004 | Miao | |
| 2005/0073575 A1 | 4/2005 | Thacher et al. | |
| 2005/0085935 A1 | 4/2005 | Ide | |
| 2005/0099492 A1 | 5/2005 | Orr | |
| 2005/0213739 A1 | 9/2005 | Rodman et al. | |
| 2005/0237377 A1 | 10/2005 | Chapweske et al. | |
| 2005/0248652 A1 * | 11/2005 | Firestone et al. | 348/14.09 |
| 2005/0256925 A1 | 11/2005 | Luo et al. | |
| 2005/0259754 A1 | 11/2005 | Ho et al. | |
| 2005/0276282 A1 | 12/2005 | Wells et al. | |
| 2006/0002681 A1 | 1/2006 | Spilo et al. | |
| 2006/0031290 A1 | 2/2006 | Mannaru et al. | |
| 2006/0050155 A1 | 3/2006 | Ing et al. | |
| 2006/0062368 A1 | 3/2006 | Saha et al. | |
| 2006/0104347 A1 | 5/2006 | Callan et al. | |
| 2006/0129909 A1 | 6/2006 | Butt et al. | |
| 2006/0244812 A1 | 11/2006 | Jeong et al. | |
| 2006/0244819 A1 | 11/2006 | Pun et al. | |
| 2007/0093238 A1 | 4/2007 | Lin | |
| 2007/0162568 A1 * | 7/2007 | Gupta et al. | 709/219 |
| 2007/0188597 A1 | 8/2007 | Kenoyer | |
| 2007/0203596 A1 | 8/2007 | Huang et al. | |
| 2007/0206089 A1 | 9/2007 | Eshkoli et al. | |
| 2007/0283403 A1 * | 12/2007 | Eklund et al. | 725/117 |
| 2008/0037580 A1 | 2/2008 | Shaffer et al. | |
| 2008/0037749 A1 | 2/2008 | Metzger et al. | |
| 2008/0088698 A1 | 4/2008 | Patel et al. | |
| 2008/0100694 A1 | 5/2008 | Barkley et al. | |
| 2008/0117838 A1 | 5/2008 | Yee et al. | |
| 2008/0284841 A1 | 11/2008 | Modai et al. | |
| 2008/0291891 A1 | 11/2008 | Jerlhagen et al. | |
| 2009/0210491 A1 * | 8/2009 | Thakkar et al. | 709/204 |

OTHER PUBLICATIONS

PCT International Search Report and Written Opinion, PCT/US08/78203, Dec. 2, 2008, 8 pages.

PCT International Search Report and Written Opinion, PCT/US08/78196, Dec. 2, 2008, 10 pages.

PCT International Search Report and Written Opinion, PCT/US08/78206, Dec. 2, 2008, 7 pages.

PCT International Search Report and Written Opinion, PCT/US08/78326, Dec. 12, 2008, 8 pages.

Singh, K.N., "Reliable, Scalable and Interoperable Internet Telephony," Columbia University Thesis, 2006, copyright 2006, [Online] [Retrieved on Nov. 23, 2008] Retrieved from the Internet<URL:http://www1.cs.columbia.edu/-kns10/publication/thesis.pdf>.

Boucher, J.A. et al., "Design and Performance of a Multi-Stream MPEG-I System Layer Encoder/Player," *In Proceedings of Multimedia Computing and Networking, IS&T/SPIE Symposium on Electronic Imaging Science and Technology*, Feb. 1995, eighteen pages, vol. 2417.

International Telecommunication Union, "Call signaling protocols and media stream packetization for packet-based multimedia communication systems," 2000, ITU-T Recommendation H.225.0, two hundred fifty-one pages.

International Telecommunication Union, "Packet-based multimedia communications systems. Annex R: Robustness methods for H.323 entities," 2001, ITU-T Recommendation H.323, thirty pages.

United States Office Action, U.S. Appl. No. 13/646,395, Mar. 6, 2013, fourteen pages.

United States Office Action, U.S. Appl. No. 13/605,741, Mar. 15, 2013, thirteen pages.

* cited by examiner

SYNCHRONIZATION AND MIXING OF AUDIO AND VIDEO STREAMS IN NETWORK-BASED VIDEO CONFERENCING CALL SYSTEMS

CROSS REFERENCE TO RELATED APPLICATIONS

This application is a continuation-in-part of U.S. patent application Ser. No. 12/242,358, "Synchronization and Mixing of Audio and Video Streams in Network-Based Video Conferencing Call Systems" filed Sep. 30, 2008 by Mukund Thapa; which claims the benefit of U.S. Provisional Application No. 60/976,464, "Video Conference User Interface and Features" filed Sep. 30, 2007 by Mukund Thapa. This application also claims the benefit of U.S. Provisional Application No. 61/417,106, "Audio/Video Playback for Recorded Video Conference" filed Nov. 24, 2010 by Mukund Thapa. All of the foregoing are incorporated by reference herein in their entirety.

BACKGROUND OF THE INVENTION

1. Field of the Invention

The present invention relates generally to video conferencing over a network. In particular, the present invention is directed towards synchronization and/or mixing of audio and video streams during a networked video conference call and for playback of recorded video conference calls.

2. Description of Background Art

Conventional networking software for video and audio conferencing permits one-way, two-way and in some cases multi-way communication between participants. Because each participant may be in a different environment and at a different location on a network, the transmission and reception of audio and video packets between various participants and/or to a central server may vary among them. For example, a participant may receive packets from a nearby participant in a more reliable fashion and with less delay than those from a participant that is more remotely located on the network. Packets may also be received out of order.

However transmitted and received over a network, audio and video data must be synchronized and mixed during display in order to produce a good video conferencing experience. For example, if the video and audio of a participant are not synchronized, then his mouth movements will not match his speech. The result can be annoying at best and can hinder communications at worst. Similarly, if the audio and/or video of different participants are not synchronized, then the unexpected pauses and timing may be interpreted as hesitations or other gestures. This can also hinder efficient communications between the participants.

Thus, there is a need for preferably simple approaches to synchronizing and mixing audio and/or video for networked participants in a video conference call.

SUMMARY OF THE INVENTION

In one aspect, the present invention overcomes limitations of the prior art by adding audio streams to a mix until the mix is either complete (i.e., all audio streams have been added) or the mix is closed early (i.e., before the mix is complete).

In one approach, audio streams from N senders are to be mixed. The N audio streams are received over a network. The audio streams are divided into portions that will be referred to as audio chunks (e.g., 40 ms audio chunks). The received audio chunks are buffered. A mix is opened and the process cycles through the N senders. If a sender's audio chunk has not yet been added to the mix and it is available from the buffer, then the sender's audio chunk is added to the mix. If the sender's audio chunk is already in the mix and the sender has at least one additional audio chunk buffered (i.e., waiting for use in a future mix), a wait counter is incremented for that sender. The mix is closed when audio chunks from all N senders have been added. It may also be closed early upon some predetermined condition based on the value of the wait counter(s) (e.g., if the wait counter reaches a maximum value).

In a different approach, the process is driven by receipt of audio chunks. A mix is opened. As each sender's audio chunk is received, it is evaluated for inclusion in the mix. If the sender is not yet in the mix and the received audio chunk is the correct audio chunk for the mix, then it is added to the mix. Otherwise, it is buffered for a future mix. Again, the mix is closed if audio chunks from all N senders are in the mix or if a predetermined early close condition is met. For example, a queue counter may be used to count the number of audio chunks in each sender's buffer. The mix may be closed early if the queue counter reaches some maximum value. In another aspect, once a mix is closed, the process attempts to use the audio chunks already stored in the buffers to create the next mix, rather than immediately creating a new mix based on a newly received audio chunk.

Another aspect concerns synchronizing audio streams and video streams. In one approach, the audio stream is played as a series of audio chunks. The video stream is considered one frame at a time. A time marker for the current video frame is compared to the expected time duration of the current audio chunk. If the current frame should occur during the current audio chunk, then it is displayed and the process moves to the next frame. If the current frame should occur after the current audio chunk, then the process checks again later. If the current frame should have occurred before the current audio chunk, then the frame is discarded and the process moves to a future frame.

These mixing and synchronization processes can be divided between clients and/or servers in different ways. For example, a client-server architecture can be used where the server performs most of the functionality described above. Alternately, a client-server architecture can be used where the server routes the various streams from client to client but the clients perform most of the functionality described above. The functionality can also be split between client and server. Peer-to-peer architectures can also be used.

In a preferred approach, a central server receives audio and video streams from each sender client. It sends the appropriate audio and video streams to each receiver client (recall that each client typically will act as both a sender client and a receiver client). Each receiver client mixes the audio streams and synchronizes the mixed audio stream with the video stream(s). In an alternate approach, the server mixes the audio streams to produce the appropriate composite audio stream for each receiver client. The server sends to each receiver client the mixed audio stream and any applicable video streams, and each receiver client synchronizes the received audio and video streams.

Other aspects of the invention include software, systems and components of systems for implementing the techniques described above. Yet additional aspects include methods and applications for all of the foregoing.

DETAILED DESCRIPTION OF THE PREFERRED EMBODIMENTS

Figure 1:
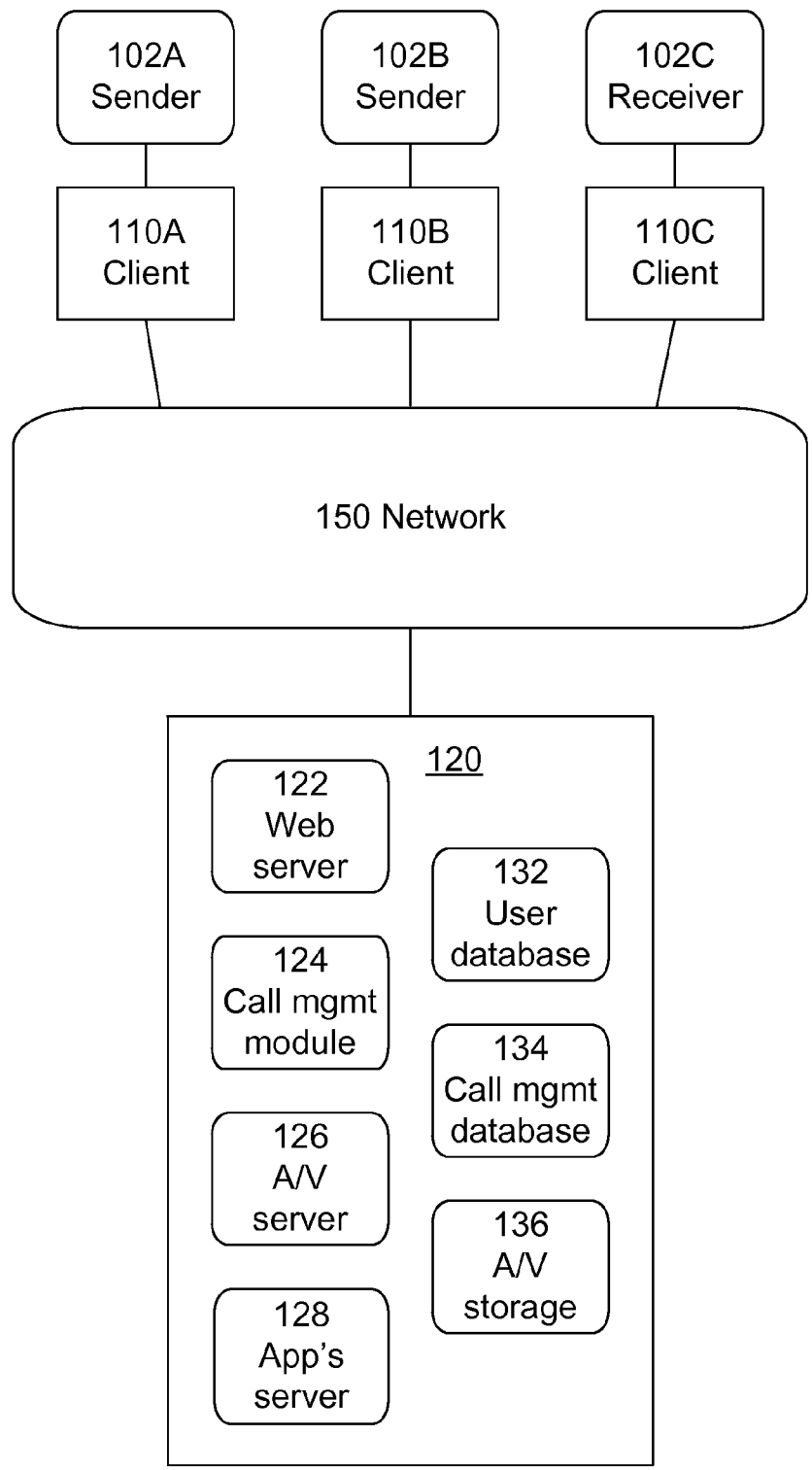
FIG. 1 is a block diagram of a server-based architecture suitable for use with the invention.

FIG. 1 is a block diagram of a server-based video conferencing architecture suitable for use with the invention. In this example, three participants 102A-C are having a video conference. Each participant 102 is operating a client device 110, which connects via a network 150 to a central server 120. In this server-based architecture, the server 120 coordinates the set up and tear down of the video conference and the collection and distribution of audio and video streams from the clients 110. In this particular example, each client 110 is a computer that runs client software with video conferencing capability. To allow full video and audio capability, each client 110 preferably includes at least one camera (for video capture), display (for video play back), microphone (for audio capture) and speaker (for audio play back).

The clients 110 are connected via the Internet to the central server 120. In this example, the central server 120 includes a web server 122, a call management module 124, an audio/video server 126 and an applications server 128. The server 120 also includes user database 132, call management database 134 and audio/video storage 136. The participants 102 have previously registered and their records are stored in user database 132. The web server 122 handles the web interface to the clients 110. The call management module 124 and call management database 134 manage the video conference calls. For example, the call management database 134 includes records of who is currently participating on which video conference calls. It may also include records of who is currently logged in and available for calls and/or their video conferencing capabilities. The audio/video server 126 manages the audio and video streams for these calls. Streaming technologies, as well as other technologies, can be used. Storage of audio and video at the server is handled by audio/video storage 136. The application server 128 invokes other applications (not shown) as required.

Figure 2:
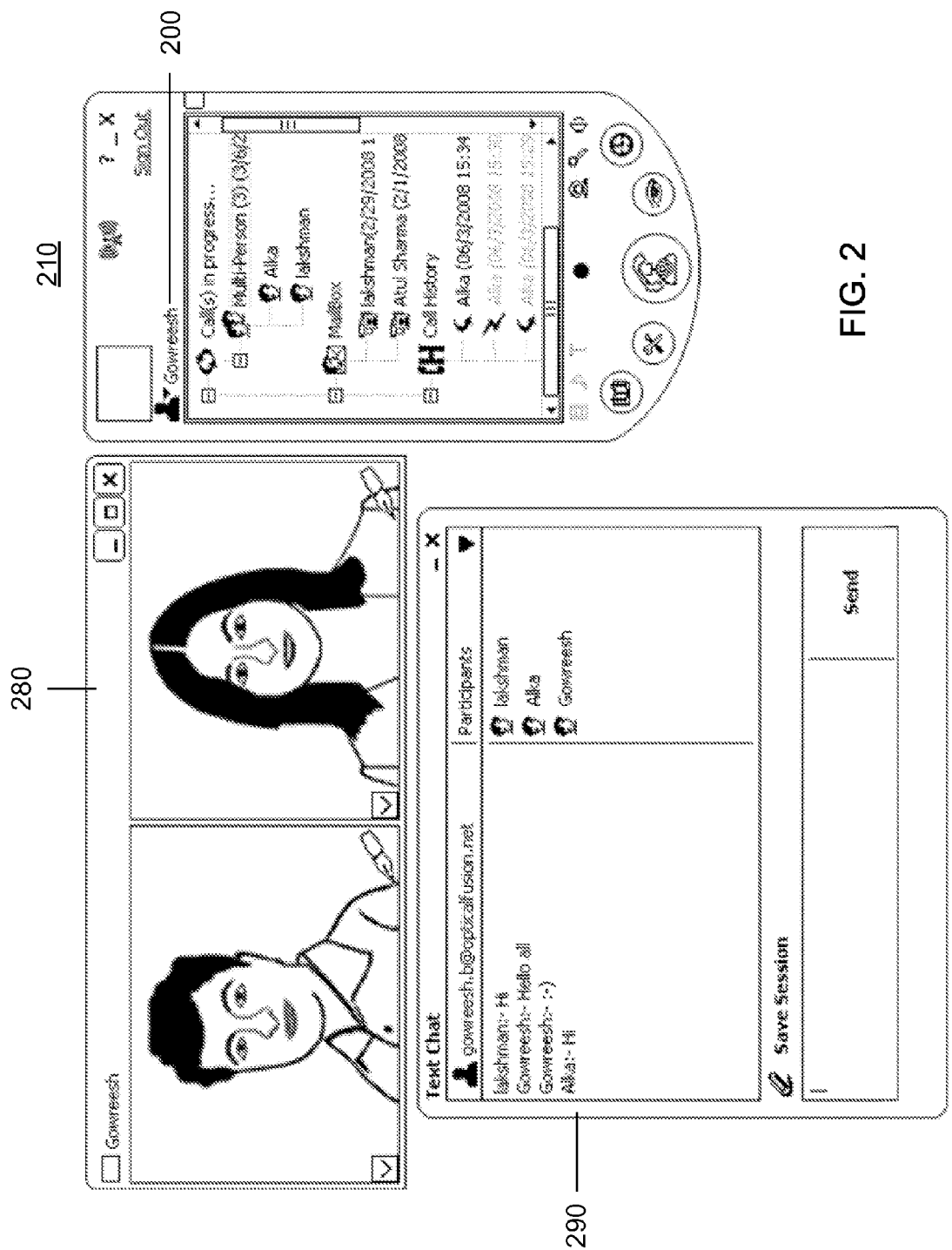
FIG. 2 is a screen shot of a participant's user interface for a video conference.

FIG. 2 is a screen shot of a participant 102's user interface for the video conference. In this example, there are three participants: Gowreesh, Alka and Lakshman. This is a multi-point example since the three participants are at different network locations. However, the invention can also be used for one-to-one situations (e.g., two-participant video call) or with more participants. FIG. 2 shows Gowreesh's screen as indicated by 200. The top-level control for the user interface will be referred to as the main communicator element 210. It includes top level controls for video conferencing. These controls typically are either displayed as graphical elements or implemented as part of pull-down menus (or other similar user interface components). Controls can be implemented as buttons, tabs, toolbars, arrows and icons, for example.

The video conference is displayed in window 280. In this example, the window 280 displays video of the other two participants: Alka and Lakshman. Gowreesh's audio system plays the corresponding audio. Ancillary window 290 lists the current participants and also provides for text chat. Files can also be shared by clicking on the attachment icon.

For purposes of explaining aspects of the invention, the participants 102A-B and their clients 110A-B will be referred to as senders, and participant 102C and its client 110C will be referred to as the receiver. In the example shown in FIG. 2, Alka and Lakshman are senders and Gowreesh is the receiver. These terms are used because Alka and Lakshman are sending audio and/or video data streams and Gowreesh is receiving these data (or derivatives of them). Of course, in most video conferences, participants will act as both senders and receivers, sending audio and video of themselves and receiving audio and video of others.

FIGS. 1-2 illustrate one example, but the invention is not limited to these specifics. For example, client devices other than a computer running client software can be used. Examples include PDAs, mobile phones, web-enabled TV, and SIP phones and terminals (i.e., phone-type devices using the SIP protocol that typically have a small video screen and audio capability). In addition, not every device need have both audio and video and both input and output. Some participants may participate with audio only or video only, or be able to receive but not send audio/video or vice versa. The underlying architecture also need not be server-based. It could be peer-to-peer, or a combination of server and peer-to-peer. For example, participants that share a local network may communicate with each other on a peer-to-peer basis, but communicate with other participants via a server. Other variations will be apparent.

As described above, one challenge of network-based video conferencing is that the various data streams from the senders 110A-B should be synchronized and mixed for display at the receiver 110C. In FIG. 2, Alka's audio and video should be synchronized to each other, and Lakshman's audio and video should be synchronized to each other. In addition, Alka's and Lakshman's audio/video streams preferably should also have some degree of synchronization. For example, if Alka asks a question, it is preferable that the video conference show Lakshman answering with his actual timing (i.e., avoiding too much relative delay or advance). This requires some synchronization of Alka's and Lakshman's audio and video streams. Alka's and Lakshman's audio streams typically would also be mixed together to form a composite audio stream for playback to Gowreesh. These tasks can be made more difficult if each of these data streams is sent as packets over network 150 since timing is not preserved in the transmission of packets. Some packets may propagate through the network 150 more quickly than others, thus arriving out of order or not arriving at all.

In the following example, it will be assumed that each sender client 110A-B creates the data streams for its respective participant 102A-B; that these data streams are sent to server 120 which retransmits them to the receiver client 110C, and that the receiver client 110C is responsible for synchronizing and mixing the data streams to produce the appropriate data streams for display to the receiver 102C. That is, in this example, all synchronization and mixing are performed locally at the client 110C.

This division of functionality is assumed primarily for purposes of explanation. In alternate embodiments, the functionality might be divided in other ways. For example, some or all of the functionality can be shifted from the receiver client 110C to the server 120. For example, the server (e.g., A/V server 126) might mix the audio streams to form a composite audio stream and then send the composite audio stream and the original video streams to the receiver client 110C. Alternately, the server 120 might also mix video streams to form a composite video stream (e.g., one video stream that contains both Alka and Lakshman in FIG. 2) for transmission to the receiver client 110C. In these examples, the client 110C may still be responsible for synchronizing received audio and video since transmission of packets over network 150 typically will not preserve their timing. In another variant, the server 120 might also synchronize the audio stream and video stream, for example by combining the two data streams into a single data stream that contains both audio and video in the correct time relationship.

However, any architecture which shifts computational burden from the clients 110 to the server 120 will require more powerful servers and may limit the scalability of the solution. For example, the mixing of video streams at the server typically requires the server to decompress both video streams, combine them (often into a non-standard format) and then recompress the mixed video stream. If a video conference has four participants and each participant is viewing the three other participants, this requires the server to decompress the four video streams, combine them three at a time into four composite video streams, and then recompress the four composite video streams. This is further compounded because the combination of separate video streams into a composite video stream may depend heavily on the user's viewing preferences. If there are multiple video conferences active at the same time, the burden on the server scales accordingly and the server preferably would be sized to handle the worst case computational burden. On the other hand, if the functionality is implemented in the clients, then the computational resources required at each client grows roughly linearly with the number of participants. In general it is impractical to combine video streams at the server; so instead they are combined at each client.

In a peer-to-peer architecture, each sender 110A-B might send its audio and video streams directly to each receiver 110C, which then is responsible for locally synchronizing and/or mixing the various data streams.

Figure 3:
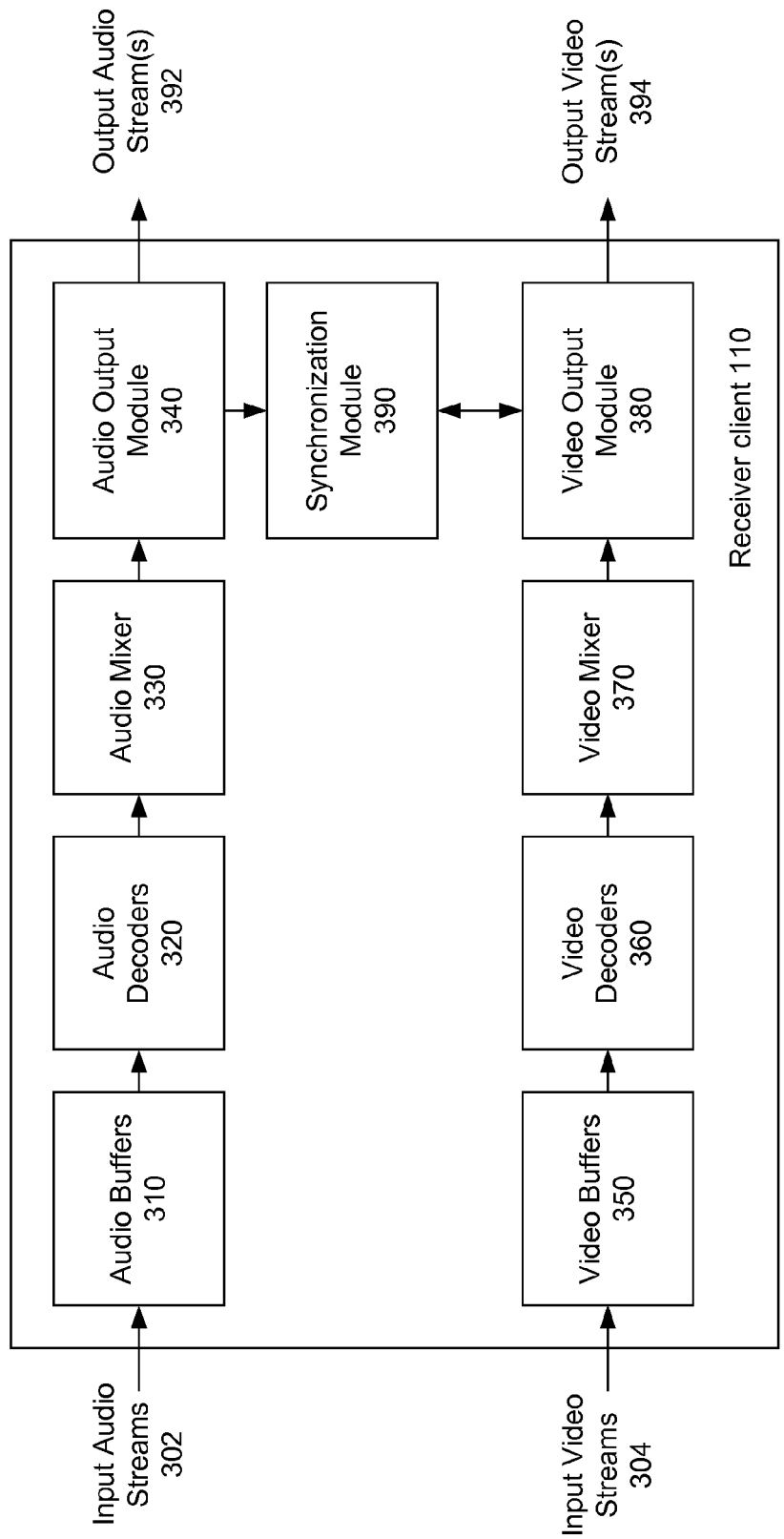
FIG. 3 is a block diagram of an example client according to the invention.

FIG. 3 is a block diagram of one example of a client for synchronizing and mixing audio and video streams according to the invention. The client includes audio buffers 310, audio stream decoders 320, audio mixer 330 and audio output module 340. The client also includes video buffers 350, video stream decoders 360, optional video mixer 370 and video output module 380. The client receives audio streams 302 and video streams 304 from the various sender clients 110A-B (via the server 120) and produces an output audio stream 392 (typically, only one) and output video stream(s) 394 (possibly, more than one) for display on the receiver client 110C. The output data streams are synchronized by synchronization module 390. The input data streams usually will not be received in a synchronized manner.

Using FIG. 2 as an example, the audio stream 392 displayed by Gowreesh's client typically will mix the audio from Alka and Lakshman. The video stream 394 typically would include two video streams, one of Lakshman and one of Alka. The audio and video streams 392, 394 are synchronized.

Consider first the mixing of different audio streams 302. Assume that audio data is captured and played back in certain duration "audio chunks." Currently, the capture is done in audio chunks of 40 ms each. The number of samples in each audio chunk is determined by the sampling frequency (and possibly also the number of audio channels). These audio chunks are packetized and sent by the sender clients 110A-B to the receiver client 110C. For simplicity, assume that an entire audio chunk fits into a single data packet. If multiple packets are required, the packets can be reassembled into the original audio chunks.

When packets of audio are received over a network, there can be loss and also delays. Thus, during mixing, for example, one sender's audio chunk may be available but another sender's chunk may not be available as yet (but yet should be included in the mix to prevent distortion). In one approach, the idea is to cycle through the senders putting one audio chunk from each sender into the mix. If the process reaches a sender but the sender's audio chunk is not available, then cycle through the remaining senders and, at the end of the cycle, come back and recheck whether the sender's audio chunk is now available. The sender may be rechecked a certain number of times before the process times out. In one approach, the existing audio chunks may be mixed by audio mixer 330 without the missing audio chunks, which may be assumed as dropped.

Figure 4:
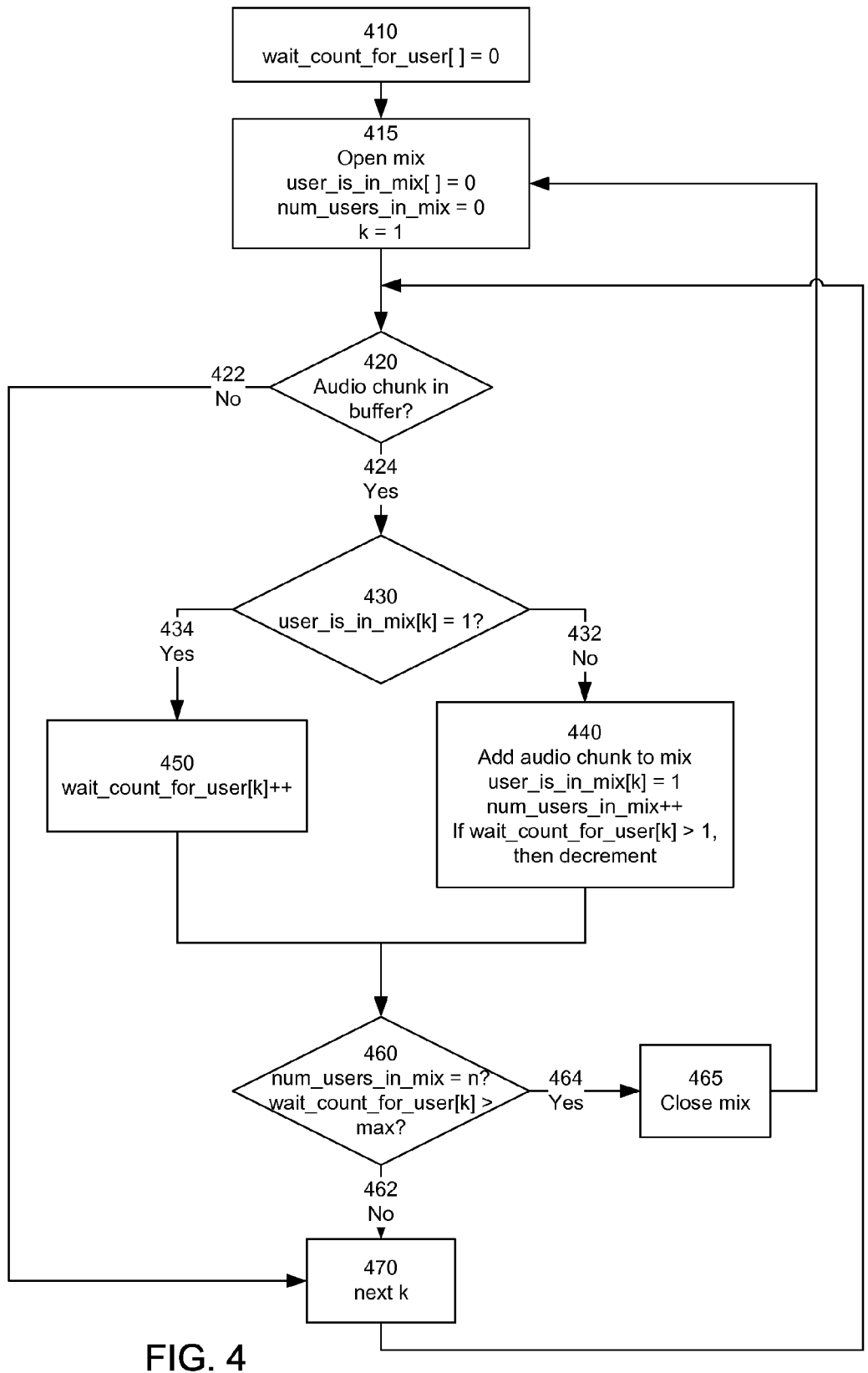
FIGS. 4-5 are flow diagrams of different methods for mixing audio streams.
Figure 5:
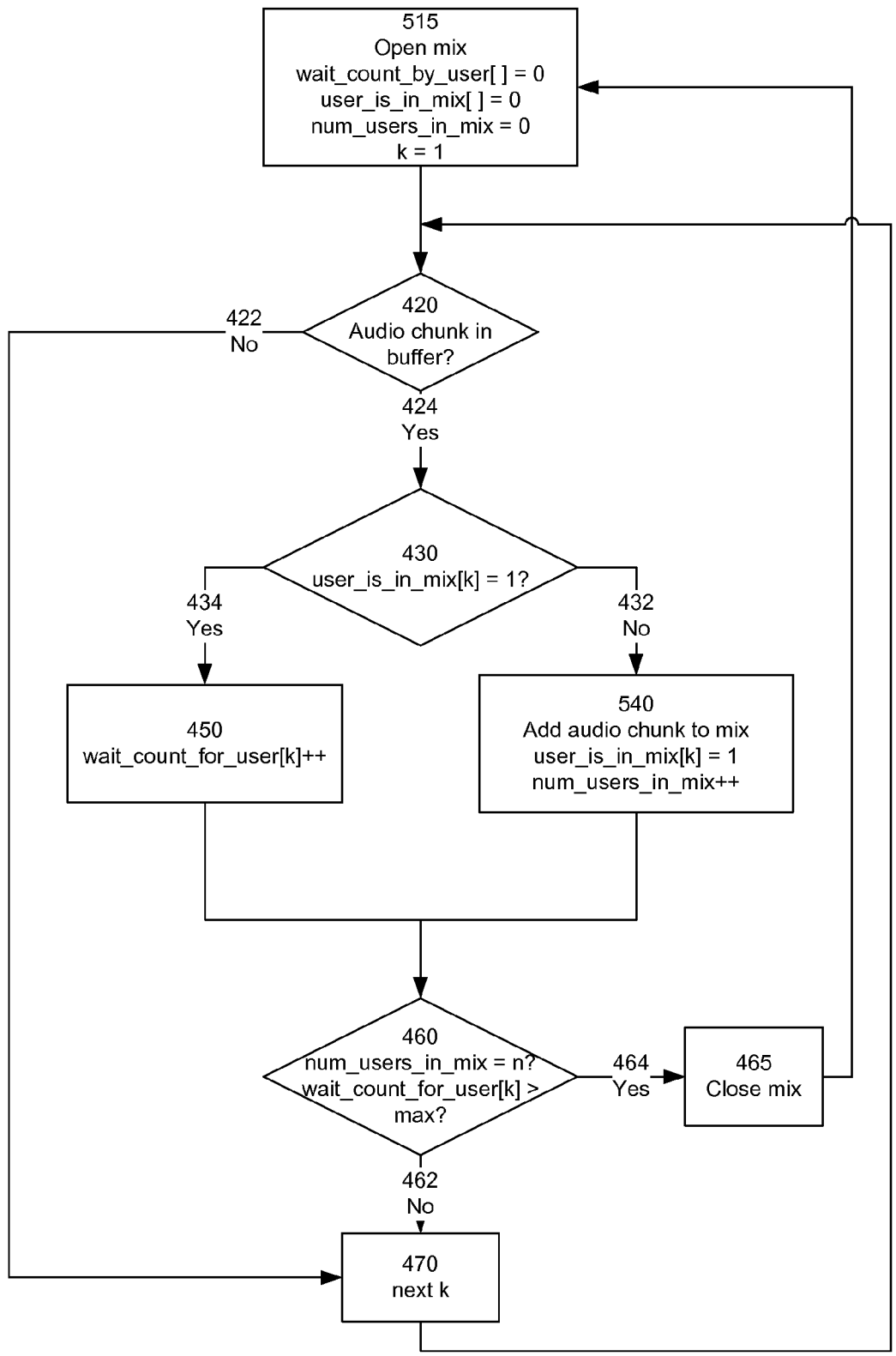

FIGS. 4-6 are flow diagrams showing three different implementations for mixing audio chunks. In these flow diagrams, audio chunk size is expressed in milliseconds (ms). This will be the duration of audio that will be played before the next audio chunk is played. A "mix" is the set of all audio chunks that should be combined at a given instant. The mix may have the audio chunks combined using standard approaches or may be kept separate for playback in a player which will mix it. If there are n+1 participants in a video conference, then there typically will be n senders for each receiver. That is, the mix for the receiver at a time t should include the audio chunks for time t from the n senders. A particular sender is "in the mix" if his audio chunk is available for mixing. The mix is "complete" when all audio chunks are available for mixing.

The following symbols are used in FIGS. 4-6. Senders are sometimes referred to as users:

n is the number of audio streams that are to be mixed (i.e., number of senders). Typically, a value of n implies a video conference with n+1 participants. A complete mix will have n audio chunks, one from each sender.

user_is_in_mix is an array of dimension n. Each element k of the array is either 0 or 1. If user_is_in_mix[k]=1, this means the audio chunk for sender k is in the mix. A value of 0 means it is not in the mix.

num_users_in_mix is the total number of senders currently in the mix. This is the summation of the elements of the array user_is_in_mix. If num_users_in_mix=n, then that mix is complete. If<n, then it is incomplete.

wait_count_for_user is an array of dimension n. wait_count_for_user[k] is the number of times that sender k, who is already in the mix, has an audio chunk available for some future mix, but must wait because the current mix is not yet complete.

max_wait_count is the maximum value of wait_count_for_user for any sender k before the mix is closed (even though still incomplete). Analysis, confirmed by experimentation, suggests that the value 3 works well, although other values can also be used.

q_count_for_user is an array of dimension n. queue_count_for_user[k] is the number of audio chunks that sender k, who is already in the mix, has available for future mixes. The audio chunks are queued because the current mix is not yet complete.

max_q_count is the maximum value of queue_count_for_user for any sender k before the mix is closed (even though still incomplete).

k is a counter that counts through the senders.

Three example algorithms are described in FIGS. 4-6. In the first two, audio buffers are filled for each sender as packets arrive, and the mixing process independently accesses these buffers. In the third example, as each packet arrives, it is sent to the mixing algorithm and processed immediately if possible or else stored in a buffer for future processing. The decoding of the packets is not directly relevant to the discussion and can take place at one of several different points. An important concept in all the algorithms is the wait count or queue count, which allows the handling of delays in when the packets are received.

The general idea behind FIG. 4 is as follows, with reference to FIG. 3. Audio chunks arrive over a network and are put into the appropriate audio buffer 310, with different buffers 310 for each sender. This typically is an independent process and implemented as a separate thread. The mixing algorithm 330 is started 410, 415 independently and accesses the audio buffers 310 in sequence (loop 470). For each audio buffer (sender), if there is no audio chunk available 422, then the process proceeds 470 to the next audio buffer. If there is an audio chunk available 424, then the process checks 430 whether that sender is already in the mix. If not 432, then the audio chunk is added 440 into the mix (assuming the audio chunk is for the right time period). If a sender is already in the mix 434, then his/her wait count is increased 450 by 1. The process then checks 460 whether the mix should be closed. The mix is closed 464, 465, if the mix is now complete (i.e., all senders are in the mix) or if the process meets some other predetermined early close condition, for example if the process times out or, in this case, if the maximum wait count for any sender is reached. If the mix is not closed, the loop 470 increments to the next audio buffer. When the next mix is opened 415, then as each sender's audio chunk is added 440 to the mix, the wait count, if positive, is decremented (last step in 440).

FIG. 5 is a variation of FIG. 4. The difference is that each time a new mix is opened 515, the wait count for all users is initialized to zero. Also compare step 540 to step 440.

Figure 6A:
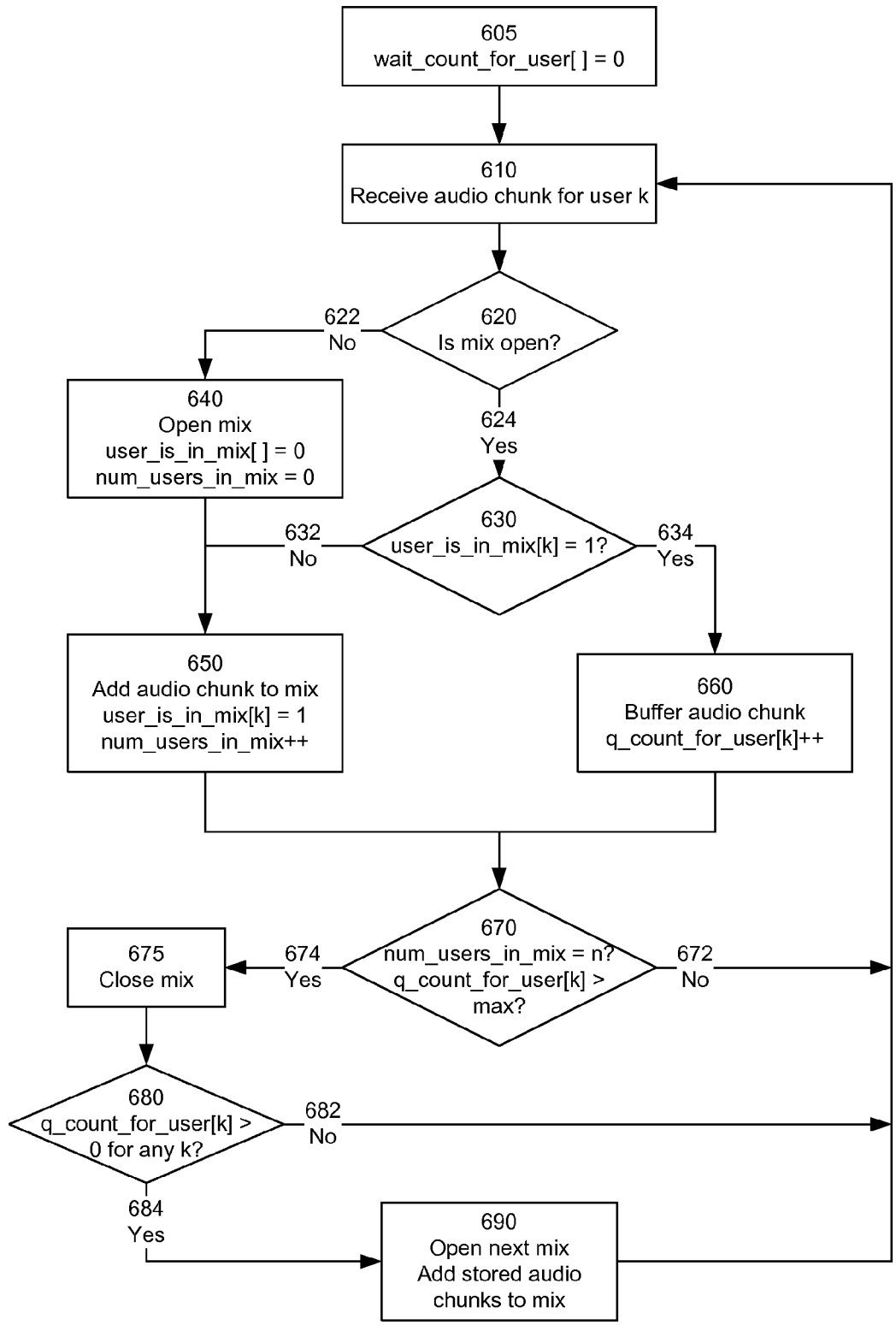
FIGS. 6A-6B are a flow diagrams of another method for mixing audio streams.
Figure 6B:
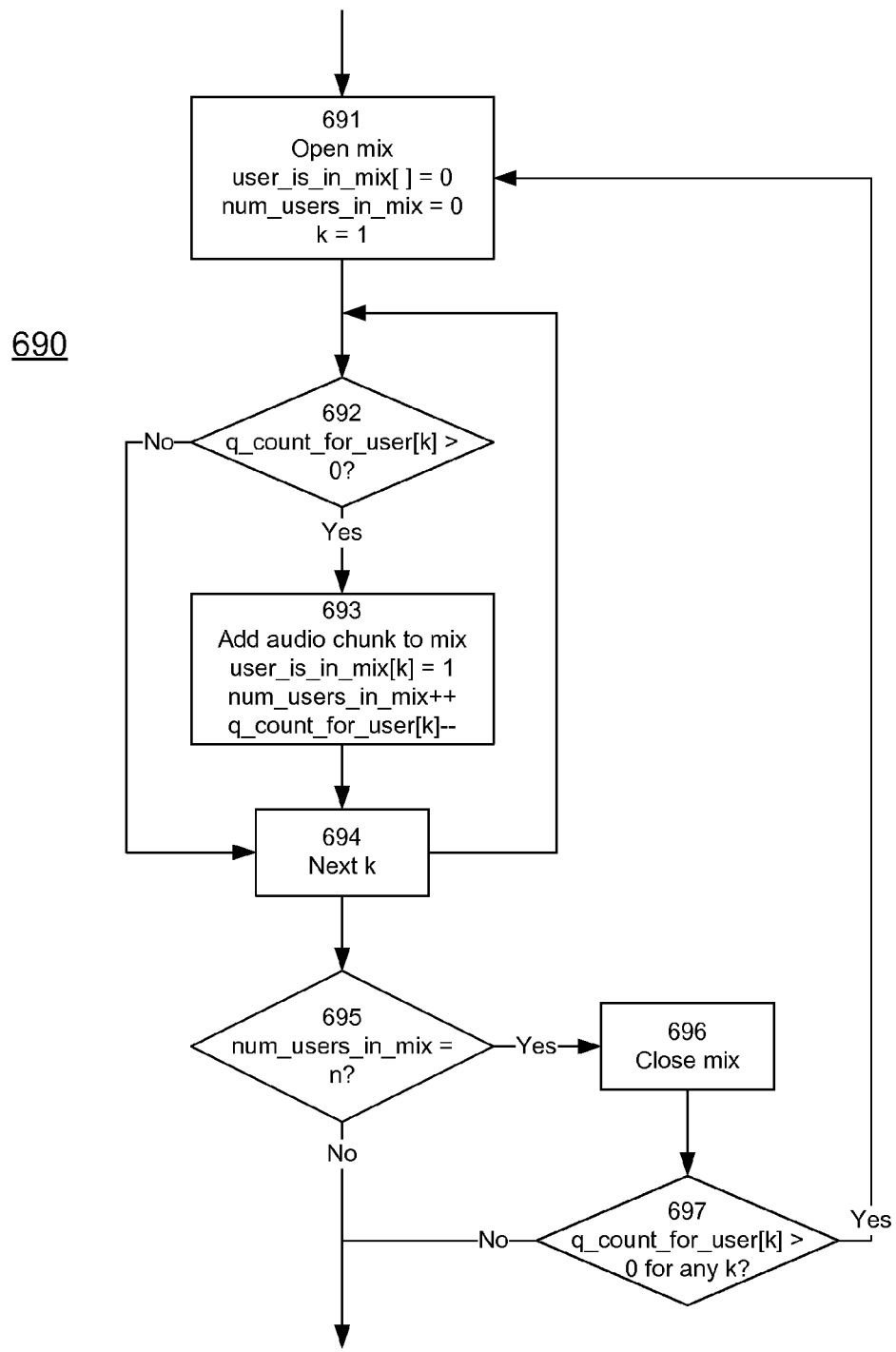

FIGS. 4 and 5 typically are implemented as two threads because the audio chunks are received independently of when they are processed by the mixing algorithm. FIG. 6A-6B is an example that coordinates the receiving of audio chunks with the mixing. It can be implemented as a single thread. In FIGS. 4 and 5, the process was driven by automatically buffering the audio chunks as they are received and then sequentially cycling through the audio buffers. In FIG. 6, the process is driven by the receipt of audio chunks.

Referring to FIG. 6A, the general idea is as follows. Audio chunks arrive over a network as mentioned before. This time, however, as each chunk is received 610, it is evaluated for possible mixing. If a mix is not 622 currently open, then a new mix is opened 640 and the received audio chunk is added 650 to the mix (if for the correct time period). If a mix is already open 624, then there are two possibilities. If this sender is not 632 in the mix, then the audio chunk is added 650 to the mix. If this sender is 634 in the mix, then the audio chunk is buffered 660 for use in a future mix and the queue count for the user is increased 660 by 1. In step 670, once each sender has an audio chunk in the mix or the queue count reaches its maximum (or other early close condition is met), the mix is closed 674, 675. Otherwise 672, the process waits to receive 610 the next audio chunk.

When a mix is closed 676, there may be several audio chunks in the buffers (from step 660). If this is ignored, the buffers may overflow. Accordingly, in this example, when the mix is closed 675, a check 680 is performed to see if the queue count of any sender is greater than zero. If not 682, then the process waits 610 to receive the next audio chunk.

However, if any queue count is greater than zero 684, then the process tries to use 690 these stored audio chunks. For example, a new mix could be opened in step 690 and any applicable stored audio chunks added to the mix (which could be from more than one sender), decrementing the corresponding queue counts. Various approaches can be used to do this. If the mix can be completed, then the process 680-690 repeats. Once the process 690 of trying to deplete the audio buffers is completed, the process returns to be driven by receiving 610 the next audio chunk. The process of trying to use stored audio chunks can also be used in the processes of FIGS. 4-5.

FIG. 6B is a flow diagram of one approach to process 690. In this example, a new mix is opened 691. The process cycles 694 through the buffers for the senders. If a sender has an audio chunk available 692, it is added to the mix 693 and the queue counter for that sender is decremented. If audio chunks are available for all senders, then the mix will be completed 695. In that case, the mix is closed 696. If any queue count is greater than zero 697, then the process repeats. If the mix is not complete, then the process returns to receive 610 the next audio chunk.

In FIG. 6, the queue count has a slightly different meaning than the wait count in FIGS. 4-5. In FIG. 6, the queue count for a sender is the number of audio chunks currently buffered waiting for a next mix. In FIGS. 4-5, the wait count was the number of times a particular sender had to wait because he was already in the current mix and had additional audio chunks buffered for future mixes.

The above algorithms do not address where the mixed audio is stored. Typically the mix is stored in a buffer which is accessed by the playback process. Thus, it may happen that when a new mix is opened, the buffer may be full. In this case, one strategy is to check every few ms (for example $S_A/8$) if a slot is open in the buffer (due to playback).

Now turn to video synchronization. With respect to FIG. 2, Alka's video should be synchronized to Alka's audio. If Alka's and Lakshman's audio streams have been mixed to produce a composite audio stream, then Alka's video should be synchronized to the composite audio stream. Audio-video synchronization is preferably achieved by playing the audio stream and synchronizing the video stream to the audio playback. This is due in part because the audio stream has a tighter time tolerance (i.e., jitter tolerance) for playback.

A time marker is added to each audio chunk or video frame captured. In the case of audio if a 40 ms audio chunk is captured, then the marker is tracked as of the start of the audio sample. A 40 ms audio chunk, however, will have many audio samples. The exact number is determined by the sampling frequency. Mixed audio streams also have time markers, preferably one for each sender's audio chunk in the mix. The original audio streams have time markers and, when they are mixed to form a composite audio stream, the time marker preferably is retained for the composite audio stream. Note that the time marker need not be an actual time stamp but can be any sort of relative counter.

The differences between the audio chunk versus video frames can be explained in terms of how they are treated. For video, suppose 25 video frames per second (fps) are captured. Then each video frame is displayed and held for 40 ms (1000/25). At 30 frames per second, each video frame is held for 33⅓ ms on display. For audio, suppose audio is captured in 40 ms chunks. Then 40 ms worth of audio are played back at a time, but that 40 ms audio chunk includes many audio samples per the sampling rate. The audio playback is effectively continuous relative to the video playback because there are many audio samples per video frame. Thus, the synchronization problem is to match the video playback to the audio playback. This can be done by suitably marking the two data streams and then matching the marks within specified tolerances.

In some sense, the audio playback is used to clock the video playback. In one approach, synchronization occurs as follows.

If the time marker of the video frame matches the time of the audio playback, then display the video frame.

If the time marker of the video frame is ahead of that for the audio playback, then wait.

If the time marker of the video frame is behind that for the audio playback, then skip the video frame.

The decision as to whether the video is behind, at, or ahead of the audio is determined within a certain tolerance.

Figure 7:
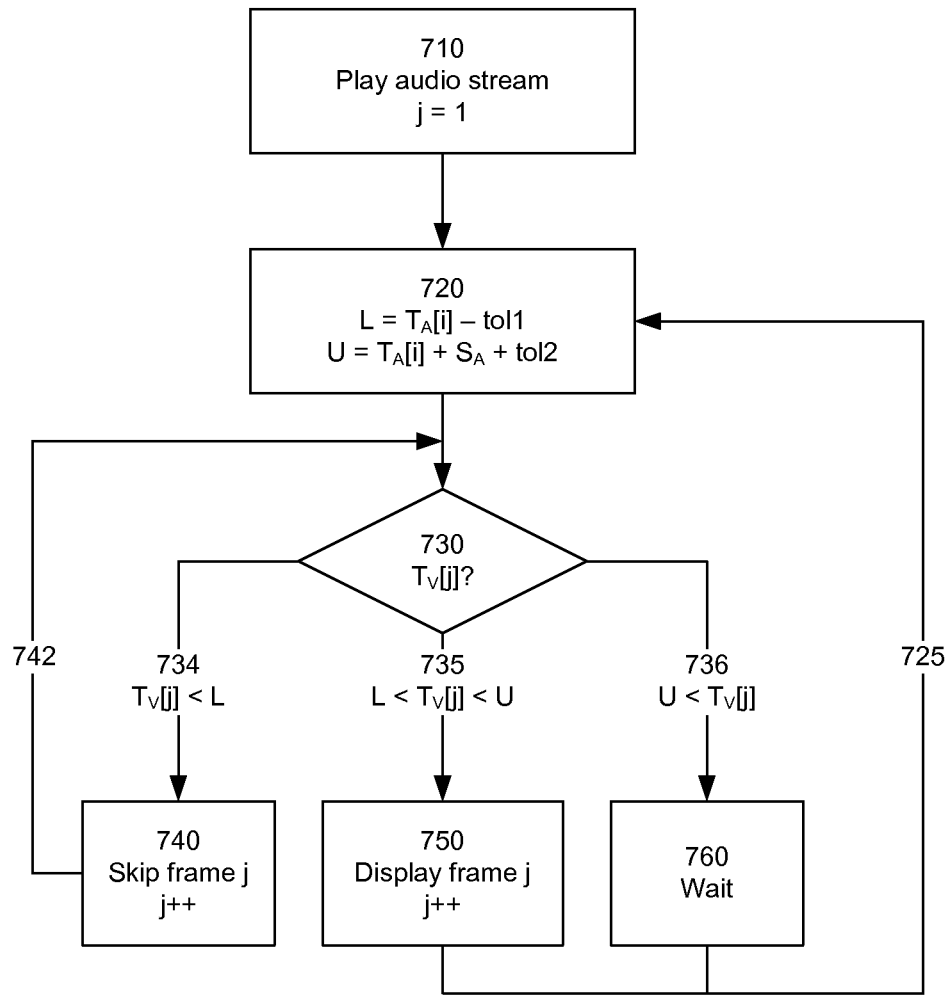
FIG. 7 is a flow diagram of a method for synchronizing audio and video streams.

FIG. 7 is a flow diagram of a specific implementation, using the following symbols:

$S_A$ is the size of the audio chunk in milliseconds. Audio is captured $S_A$ ms at a time.

$T_A[i]$ is the time at which the ith audio chunk was captured, in milliseconds.

$T_V[k]$ is the time at which the kth video frame was captured, in milliseconds.

f is the frame rate, in frames per second.

$f_D$ is the frame display duration, in milliseconds. $f_D=(1/f)*1000$.

tol1 is a tolerance for the lower bound, in milliseconds. This can be zero or higher. In practice, tol1=20 appears to work well for $S_A$=40 ms.

tol2 is the tolerance for the upper bound. This can be zero or higher. In practice, tol2=0 appears to work well.

In FIG. 7, the basic idea is that if $T_V[k]$ falls within the time period calculated for the current audio chunk, then video frame k should be displayed. The nominal time period runs from $T_A[i]$ to $T_A[i]+S_A$, which starts at time $T_A[i]$ and ends at time $T_A[i]+S_A$. Tolerances tol1 and tol2 are used to add robustness, so that the calculated time period has a start time of $T_A[i]$−tol1 and an end time of $T_A[i]+S_A$+tol2. This assumes that the times $T_V[k]$ and $T_A[i]$ are measured relative to the same reference time. This can be achieved, for example, by starting the audio and video capture threads at the same time relative to a common clock. Alternately, the sender client can start the clocks for audio and video capture at the same time. Equivalently, if the audio and video capture clocks use different time references, the offset between the two can be compensated.

In more detail, the process initializes 710 by initializing the video frame counter j and starting playback of the audio stream. In step 720, lower bound L and upper bound U are calculated for the current audio chunk being played. It is then determined 730 whether video frame j falls within the time period spanned by the current audio chunk. If it does 735, then the video frame is displayed 750 and the counter j is incremented to move to the next video frame and the process is repeated 725. If the video frame j occurs after 736 the current audio chunk (i.e., in the future), then nothing happens. The process waits 760 and repeats 725 the process at a later time. If the video frame j was to have occurred before 734 the current audio chunk, then the video frame is discarded 740 and the next video frame is tested 742 to see if it occurs during the current audio chunk. This process can be repeated until the video stream catches up to the audio stream.

FIGS. 8-11 are flow diagrams illustrating examples of synchronizing video to audio for playback of recorded video conference calls. A recorded video conference call typically includes audio and video for at least two participants. The following principles can also be applied to the playback of recorded videomail (e.g., from only a single participant). Recall that there can be multiple participants in a video conference call, each with his/her own video and audio stream. Each participant's video and audio streams should be synchronized with each other, and the participants should also be synchronized to each other. In addition, synchronization should be maintained during regular playback, as well as during "irregular playback" such as fast forward, rewind, seek, etc.

Independent of the method used to play back the audio and video, the following are generally desirable:

1. Audio streams should be present for all the participants in the recorded call, together with time stamps and possibly an index file that records the position of each block of audio. An actual audio stream is not required. For example, a virtual audio stream can be used as a reference instead. However, we will use actual audio streams in the following examples because it simplifies the explanation. The audio streams preferably all have the same number of audio frames, but this too is not strictly necessary. If the index file is not present, it can be constructed.

2. Video streams should also be present, although it is acceptable if there are portions where there is no video. Here too time stamps are desired together with an index file that records each position of each frame of video. The video and audio time stamps for each participant preferably have been matched up during capture. If the index file is not present, it can be constructed.

3. When the call recording starts, audio recording starts for each participant. Any one participant' can be chosen as the participant with the reference stream. This participant will be called the reference participant. It is convenient to choose the participant who does the recording to be the one with the reference stream. Alternatively it could be user-defined during playback.

4. In order to keep the recording synchronized for all participants, all participant audio preferably starts recording at the same time. If there is no audio for any participant (including the reference participant), silence is stored. Alternately, audio streams for different participants can start at different times, so long as the offset in start time is accounted for. If a video frame is received at the start, its time stamp can be used as the first audio packet time stamp. Otherwise the time stamp can be arbitrary, for example 0. In this case, the other time stamps are built by adding the audio size in ms, until audio is available with actual time stamps. Doing this will take care of situations such as late audio, on hold, audio blocked, etc.

The following examples apply to recorded calls, whether it be messages or recorded conferences. Here we make use of audio/video synchronization before sending media to be played to the players. Various types of audio/video synchronization can be used, but we use the general approach described in FIGS. 3 and 7 for the following explanation. In the following examples, we start with the simple case of playing all participants' audio and video and progress to more complex cases.

In these examples, audio is sent to an audio player module (APM) for processing, video is sent to a video player module (VPM) for processing, and an audio-video synchronization module (AVSM) is used to synchronize video and audio. In one implementation, the functionality in the receiver client 110 of FIG. 3 is reused for these modules. For example, the APM can be implemented by portions of blocks 310-340 in FIG. 3, the VPM can be implemented by portions of blocks 350-380 in FIG. 3, and the AVSM can be implemented by portions of block 390.

There are some differences between a live video conference call and playback of a recorded video conference call. For example, a live video conference call is subject to network issues such as variable latency, whereas playback of a recorded call is not subject to these if the audio and video streams are stored in local files. Thus, one difference is that the audio buffers and video buffers shown in FIG. 3 may be different or even absent for playback of a recorded call. Also, the audio and video mixing typically can be simplified compared to the live case. Alternate audio and video players and other synchronization approaches can also be used. The front-end synchronization is used to control the flow of sending to the players and is discussed below.

In the following, the AVSM is set up under the assumption that the streams are played in forward-mode. It returns a PLAY, WAIT, or SKIP decision. When used in reverse-mode, the same module can be used but now a SKIP decision means WAIT and a WAIT decision means SKIP. Of course, the module can be modified to return the WAIT and SKIP decisions appropriately for reverse mode by a simple setting, but it is not necessary to do so.

Figure 8:
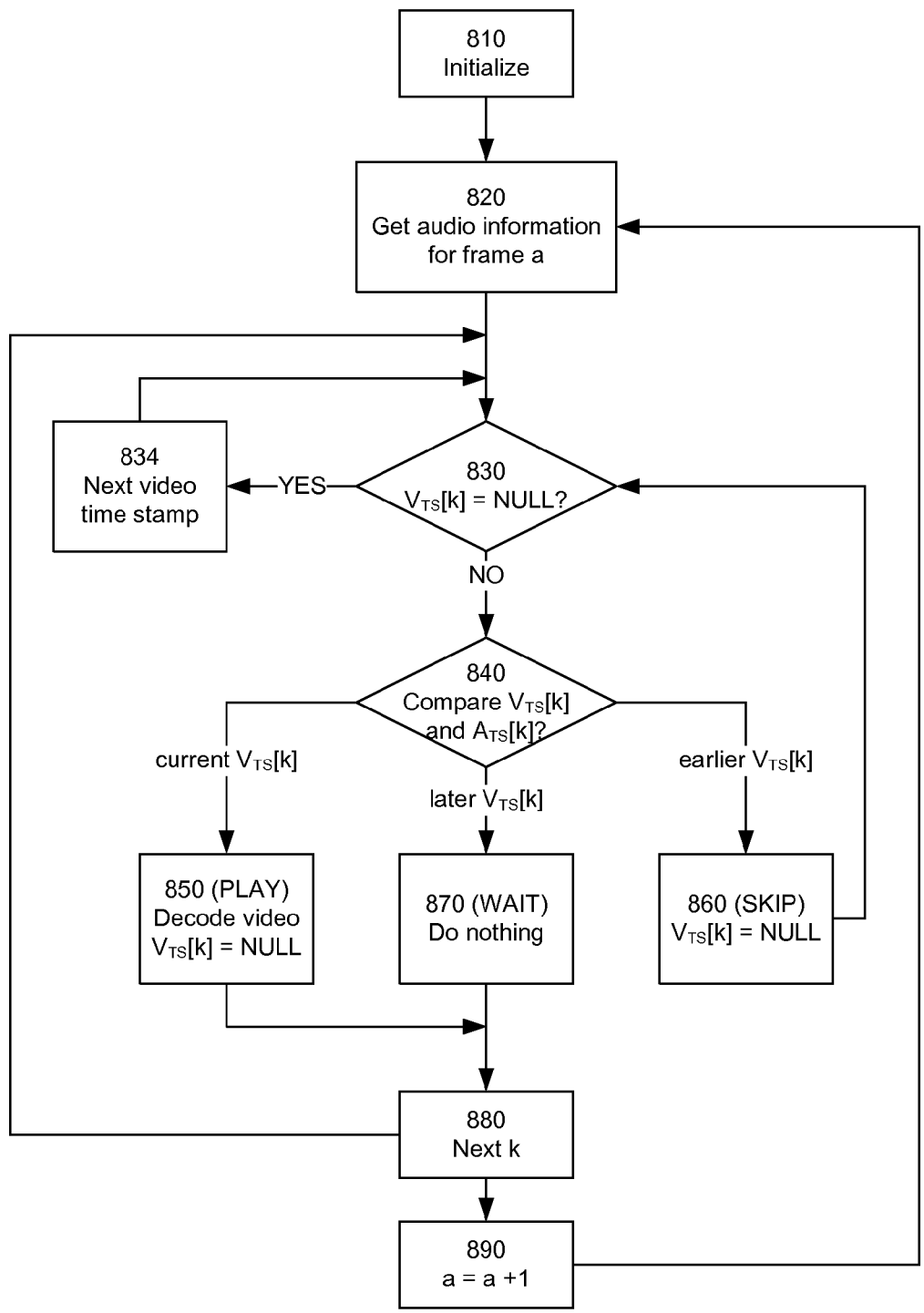
FIG. 8 is a flow diagram of a method for synchronizing audio and video streams during playback of a recorded video conference call.

Playback. FIG. 8 illustrates playback for a recorded call, according to the following steps:

Initialization (810). Initialize and check that all the streams are present with all the audio streams of the participants being the same size. Initialize the audio frame counter $\alpha=0$. Let there be N audio frames (i.e., audio chunks) in each stream. Set a video time stamp variable $V_{TS}[k]$ for each participant k to be NULL (If done outside of the VPM, then create a video time stamp array ($V_{TS}$) of size K, where K is the number of participants, and set all entries to NULL.) The video time stamp $V_{TS}[k]$ represents the time stamp of the next video frame to be considered for playback for participant k. A NULL value indicates that the so-called next video frame has already been considered, and so processing should retrieve another video frame. Step 810 is done when a new message is to be played; that is, whenever the message playback module is invoked. The following algorithms described here assume this initialization has already been performed.

Get audio information (820). For audio frame $\alpha$, get the audio frame time stamps for each participant and the seek the corresponding position in the audio file (if not already available). Read the audio for each participant, decode, and send to APM for each participant together with the time stamps.

Get video information (830-880). For each participant k, do the following. Check 830 the entry in $V_{TS}[k]$. If $V_{TS}[k]$ is NULL, then get 834 the next video time stamp from the video stream and index files for participant k. If no entries exist, then skip further video processing for participant k. If $V_{TS}[k]$ is not NULL, then send the audio and video time stamp for participant k to the AVSM. Compare 840 the audio time stamp $A_{TS}[k]$ and video time stamp $V_{TS}[k]$, to determine if they are within a specified tolerance of each other (i.e., if the video time stamp falls within a time interval [T−tol1, T+$S_A$+tol2], which we refer to as a time period, associated with the audio time stamp $A_{TS}[k]$). If it does, then the decision is to PLAY 850 the video frame. Decode and send the video frame and video time stamp value to VPM for playing. Also set $V_{TS}[k]$ to NULL to indicate that the video frame has been processed. If the video frame is for a later audio frame (i.e., if the video time stamp is after the end of the time period for the audio time stamp) 870, then the decision is to WAIT 870. Do nothing. If the video frame is for an earlier audio frame (i.e., if the video time stamp falls before the beginning of the time period for the audio time stamp) 860, then the decision is to SKIP 860 the video frame. Set $V_{TS}[k]$ to NULL and go to step 830 in order to get 834 the next video frame.

Check Termination Criteria (890). Set $\alpha \leftarrow \alpha+1$. If $\alpha < N$ (i.e., if there are more samples remaining), then repeat for the next audio frame.

Fast Forward.

Fast forward (FF) operates along similar lines as playback, with the additional consideration that video frames are shown at the FF speed. Typically, no audio is played during FF, although it is possible to play audio for slower FF modes. Two different FF modes are described below.

Figure 9:
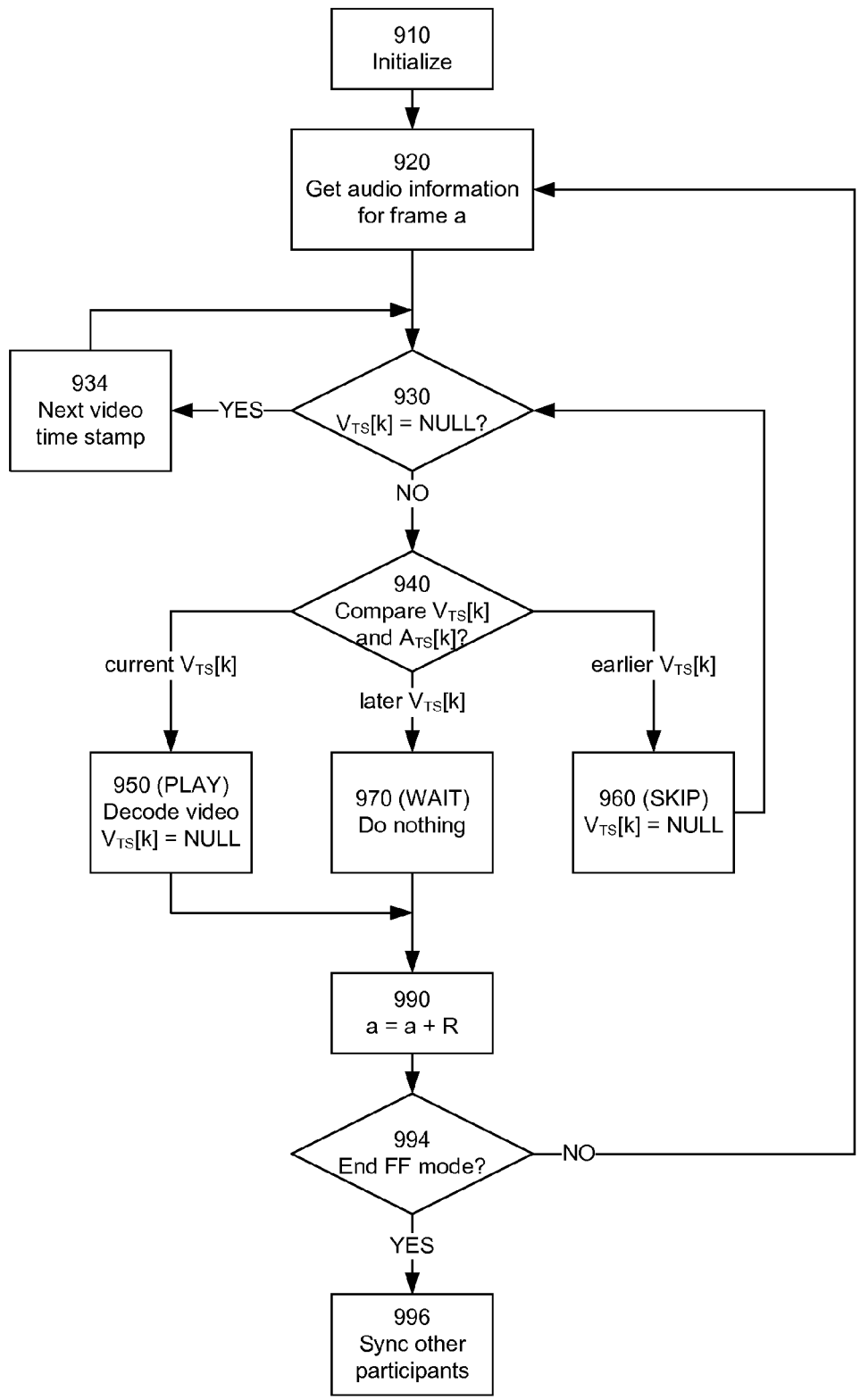
FIG. 9 is a flow diagram of a method for synchronizing audio and video streams during fast forward of a recorded video conference call.

Fast Forward with Single Stream Display. One mode is to display the fast forward video only for a reference stream (which can be any of the video streams). For example, we can take it as the person who recorded the call, or it can be random, or it can be the video selected by the user who is doing the playback. Once the fast forward ends, the other streams are played synchronously. FIG. 9 illustrates an example of this. FIG. 9 is largely the same as FIG. 8, but with the following differences:

Initialization (910). An additional input is the fast forward speed R. The speed R is, for example, R=2,4,8, etc., up to the maximum that can be handled. The fast forward speed can also be fractional. Assume as earlier, 20 ms as the size of audio. If video is to be played without audio, then APM and VPM can be informed of this so VPM will not rely on audio for any synchronization. For APM and VPM, one method to signal this is to set the synchronization time stamp to NULL, to allow video playback only.

Get audio information (920). For audio frame a, get the audio frame time stamp and the seek position in the audio file, if not already available. Note: If audio is to be played for any of the fast forward modes, such as 2×, then the time stamp is sent to APM together with a modified audio sample. If no audio is played or if audio is not available, video can be synchronized to a virtual audio stream. For example, an audio frame time stamp can be used as a reference, even though there is no actual corresponding audio data.

Get video information (930-970). This process is largely the same as in FIG. 8, but it is performed only for the reference participant k. In addition, there are some minor adjustments because not every audio frame is considered. Rather, only every Rth audio frame is considered. Compare 940 the audio time stamp $A_{TS}[k]$ and video time stamp $V_{TS}[k]$, to determine if they are within a specified tolerance of each other. If they are, then PLAY 950 the video frame. Decode and send the video and video time stamp value to VPM and set $V_{TS}[k]$ to NULL. If the video time stamp is before the time period for the current audio time stamp (i.e., video frame is for an earlier audio frame), then SKIP 960 the video frame. For some types of video encoding, although we do not display the video frame, we may still decode it, for example if that is necessary to decode later video frames. Set $V_{TS}[k]$ to NULL and go to step 930 in order to get 934 the next video frame. If the video time stamp is after the time period for the audio time stamp (i.e., video frame is for a later audio frame), then WAIT 970. Do nothing.

Since fast forward may skip some audio frames, it is possible that strictly enforcing the decision 940 as described above may result in a situation where video frames frequently do not align with audio frames, thus producing a string of SKIP and WAIT decisions with few actual PLAY decisions. This is especially possible if the video frames are sampled at a slow rate. One approach to reduce this risk is to alter the decision 940. If the current decision 940 is to WAIT 970 but the previous decision was to SKIP 960, then change the current decision to PLAY 950 and display the video frame.

Check Termination Criteria (990-994). Wait 20 ms and set $\alpha \leftarrow \alpha + R$ (which is the next $\alpha$ in this instance). If $\alpha < N$ then there are remaining audio frames. Repeat for the next audio frame, if still in fast forward mode.

Catch up Other Participants (996). If fast forward mode is ended, then synchronize the other participants k by doing the following for each participant. Find the video frame with matching time stamp by running through the index file. Find a PLAY decision, or a SKIP decision followed by a WAIT decision (which is treated as a PLAY decision in this example). The video frame with the WAIT decision becomes PLAY for now. (Alternatively, we could make the video frame with the SKIP decision as PLAY. This comment also applies to Step 970). If no entries are found, then there is nothing more to display. From this video frame work backwards to find the nearest I frame, and set $V_{TS}[k]$ to the time stamp.

Note 1: When fast forwarding, a look ahead can be employed based on the rate. The current audio frame position is a and the next fast forward frame position is $\alpha + R$. Assume for this example that the video is MPEG encoded. If an I frame is reached as the PLAY decision at audio frame $\alpha|R$, then there is no need to decode any P (or B) frames along the way in step 960. If an I-frame is crossed and a P (or B) frame PLAY decision is encountered at audio frame $\alpha + R$, then we decode in step 960 from this I-frame onwards but do not decode any frames prior to this. One implementation is a simple flag setting or counter to determine when to decode in step 960. The above two conditions can be combined to only use the second condition above. The two are laid out for clarity. Because we can predict in advance exactly which frame will be crossed, we can do other efficiency improvements and start decoding the I-frame in advance and be prepared.

Note 2: In an alternate approach, we could get audio information for all participants, rather than just for the reference participant.

Fast Forward with all Streams Displayed. When applying fast forward module for recorded calls, another method is to display the fast forward video for all the streams. This approach is similar to FIG. 8, with the main difference being that the audio frames are advanced R times faster. In step 890, rather than setting $\alpha \leftarrow \alpha + 1$, instead set $\alpha \leftarrow \alpha + R$. Another difference is that step 870 is modified in the same manner as described for step 970.

Fast Forward Notes. A hybrid approach would try to show as many videos as possible, failing which it would resort to some subset of the video frames. One approach would be to determine in advance the amount of CPU and memory available and then decide if one or more videos can be shown. Another approach is monitoring the CPU (and/or memory) usage, and if very high, then cut back on the videos to be shown. The extent to which multiple videos can be shown during FF is also dependent on source frame size; the larger the size the higher the CPU and memory requirements. In fact a high FF may not be possible on very slow machines with even simple video calls if a large frame size is used. Modern machines have sufficient power for this.

If only one stream is being displayed, the other video streams can be shown as blank or with the last frame played. On the frozen video, text can be superimposed to show that FF is being done and the speed of FF can be displayed.

Rewind

Rewind is along similar lines as fast forward, with the additional consideration that video frames are decoded starting with the closest prior I-frame. Audio is typically not played during rewind, but can be as unintelligible sound.

Figure 10:
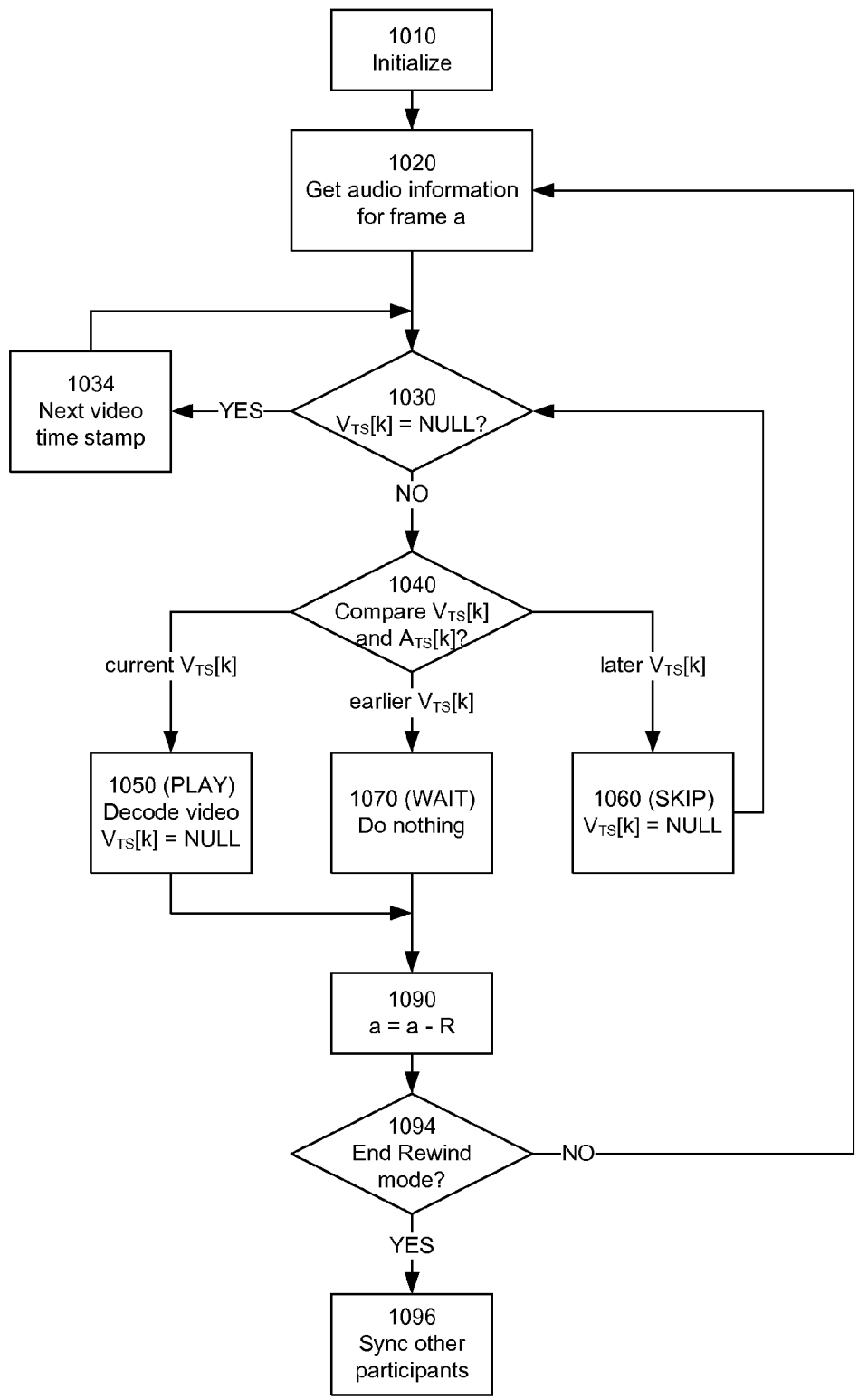
FIG. 10 is a flow diagram of a method for synchronizing audio and video streams during rewind of a recorded video conference call.

Rewind with One Stream Display. When applying the rewind module, for recorded calls, display the video only for the reference stream (which can be any stream). For example, we can take it as the person who recorded the call, or it can be random, or it can be the video selected by the user who is doing the playback. Once the rewind ends, the other streams are played synchronously. FIG. 10 illustrates an example of this. FIG. 10 is largely the same as FIGS. 8 and 9, but with the following differences:

Initialization (1010). The rewind speed R is for moving in the backwards direction rather than the forward direction (as it was for fast forward).

Get Audio Information (1020).

Get video information (1030-1070). Some special considerations occur in rewind, compared to fast forward. If PLAY 1050, then two cases arise (using MPEG encoding as an example): If it is an I-frame, then decode. On the other hand, if it is a P-frame, then search backwards for the nearest I-frame and decode from there until the P-frame. Send the video and video time stamp value to VPM. Set $V_{TS}[k]$ to NULL.

Note that the tests for SKIP and WAIT are reversed compared to the fast forward case, because rewind is moving in the reverse direction. In FIG. 9 for fast forward, if the video time stamp was earlier, this meant that the audio had passed the video so the video frame should be SKIPPED 960. In FIG. 10, however, an earlier video time stamp means that the audio has not yet caught up to the video frame (since the playback is in reverse), so the decision is to WAIT 1070. If the decision is to WAIT 1070, then do nothing. However, if the previous decision was to SKIP, then change the decision to PLAY 1050. If the decision is to SKIP 1060, then set $V_{TS}[k]$ to NULL and go to step 1030.

Check Termination Criteria (1090). Wait 20 ms and set $\alpha < \alpha R$ (which is the next $\alpha$ in this instance). If $\alpha > 0$ then there are remaining audio frames. Repeat if still in rewind mode.

Catch up Other Participants (1096). If rewind mode is ended, then synchronize the other participants k by doing the following for each participant. Find the video frame with matching time stamp by running through the index file in reverse order. Find a PLAY decision, or a SKIP decision followed by a WAIT decision (which is treated as PLAY); the frame with the WAIT decision becomes PLAY for now. (Alternatively, in the latter case we could make the frame for the SKIP decision as PLAY; this comment also applies to step 1070). If no entries are found, then there is nothing more to display. From this video frame work backwards to find the nearest I frame, and set $V_{TS}[k]$ to the time stamp. Now repeat steps 1030-1070 on their own.

Note 1: The decision tests used in 940, 1040 are the same, but return different actions depending on whether the playback is in the forward direction or reverse direction. For example, a test condition that leads to a WAIT decision in forward-mode, leads to a SKIP decision in reverse-mode.

Note 2: Similar to that described for the fast forward case, a look ahead can be employed based on the rate. For example, if an I frame is reached as the PLAY decision at audio frame $\alpha - R$, then we can do nothing but wait or simply start a new process to decode and thus be ready to display in advance. If a P (or B) frame PLAY decision is encountered for the video frame corresponding to audio frame α−R, then we can find the I-frame prior to that and separately start a process to start decoding from there. All other decoding is ignored. The implementation is a simple flag setting or counter to determine when to decode in step 1050. The above two conditions can be combined to use only the second condition above; the two are laid out for clarity.

Note 3: In an alternate approach, we could get audio information for all participants, rather than just for the reference participant.

Rewind with All Streams Displayed. When applying rewind for recorded calls, another method is to display the video for all the streams during rewind. This approach is similar to FIG. 8, with the main difference being that the audio frames are reversed at R times normal speed. In step 890, rather than setting α<α|1, instead set α<αR. In addition, steps 860 and 870 are modified as described above for steps 1060 and 1070.

Seek Forward

Seek forward is similar to fast forward, except here the rate of movement is done by the user and is random at any point in time. Audio is typically not played during seek forward. Basically the same idea as fast forward applies. To start with, the seek position and audio/video frames are obtained.

The external software module periodically obtains the seek position with respect to the audio (and, of course the final seek position if the process stops). The position is a percentage and will be denoted by ρ. Next the audio frame is obtained. We denote this by α as before.

Based on the audio frame, the nearest video frame information is picked. There are many ways to do this. In one approach, go forward from the last known position until the video frame is found. In another approach, use an estimate of video frame rate or index file length to find an approximate position and then work with AVSM from there on. Another approach uses a binary search between the last known position and end of index file for video.

Figure 11:
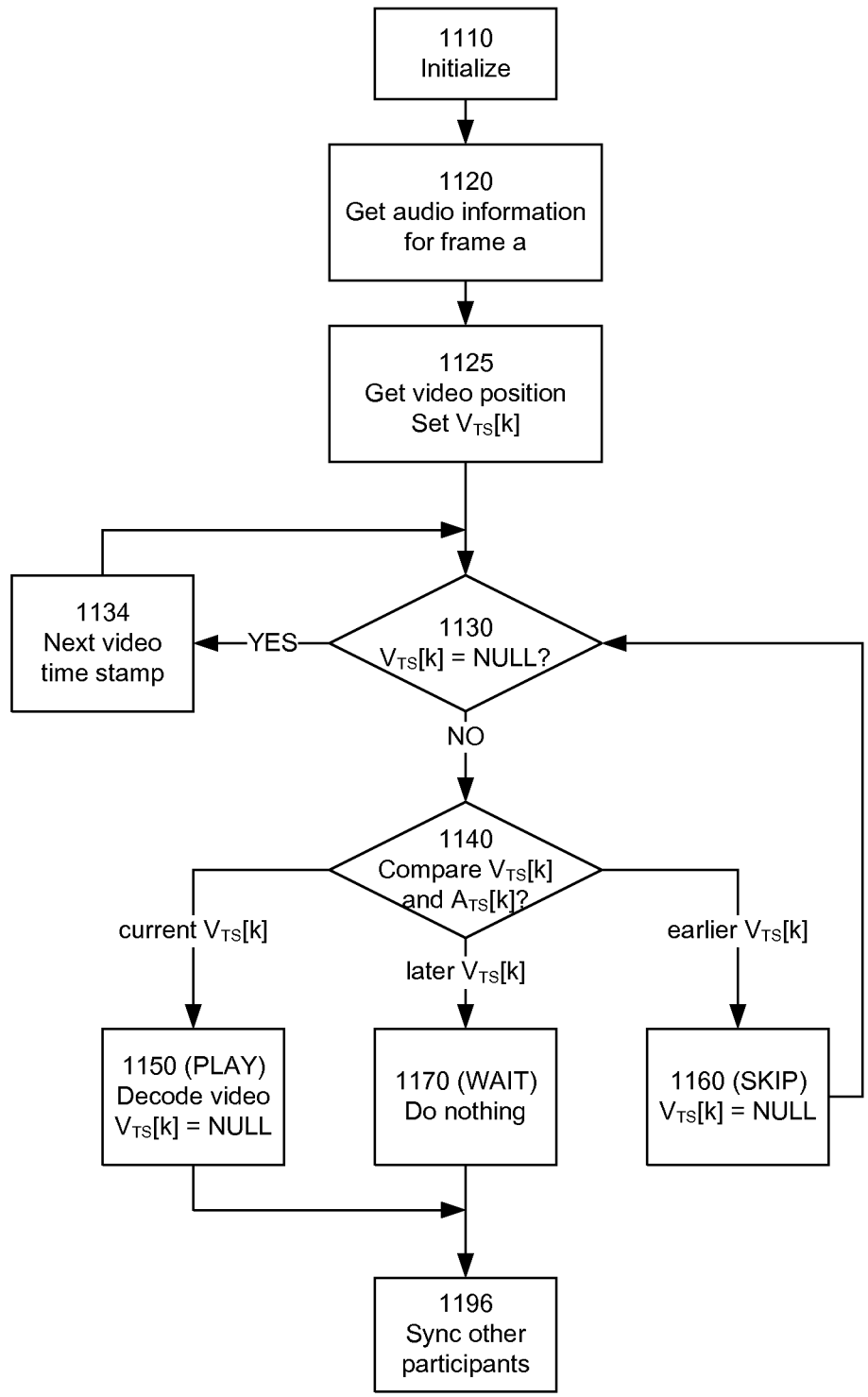
FIG. 11 is a flow diagram of a method for synchronizing audio and video streams during seek forward of a recorded video conference call.

FIG. 11 is a flow diagram for one example of seek forward with one stream displayed. The other streams are synchronized once the seek forward is completed.

Initialization (1110). An additional input is the seek position ρ as a percent of the seek bar location. The position ρ is used to compute the audio position in the index file and the audio frame counter α determined directly. This audio frame counter must be greater than the previous audio frame counter for it to be a forward seek. Assume as earlier, 20 ms chunks of audio, though this can be some other appropriate size.

Get audio information (1120). For audio frame α (the seek position in the file), get the audio frame time stamp for participant k.

Get video position (1125). Based on the seeked audio frame α, find the corresponding video frame for the reference participant. Set $V_{TS}[k]$ accordingly.

Get video information (1130-1170). For reference participant k, send the audio and video time stamp for participant k to the AVSM. If the decision is to PLAY 1150, then two cases arise (using MPEG as an example encoding). If it is an I-frame, then decode. On the other hand, if it is a P-frame, then search backwards for the nearest I-frame and decode from there until the P-frame. Send the video and video time stamp value to VPM. Set $V_{TS}[k]$ to NULL. If the decision is to WAIT 1170, then do nothing. However, if the previous decision was to SKIP, then change the decision to PLAY and do the process of step 1150. If the decision is to SKIP 1160, then set $V_{TS}[k]$ to NULL and go to step 1130. Note that if step 1125 does not find the exactly correct video frame, steps 1130-1170 can fine tune the video position by stepping forwards to the correct video frame.

Catch up Other Participants (1196). Synchronize the other participants k by doing the following for each participant. Find the video frame with matching time stamp by running through the index file. Find a PLAY decision, or a SKIP decision followed by a WAIT decision; the frame with the WAIT decision becomes PLAY for now. (Alternatively, in the latter case we could make the SKIP decision as PLAY; this comment also applies to step 1170). If no entries are found, then there is nothing more to display. From this video frame work backwards to find the nearest I frame, and set $V_{TS}[k]$ to the time stamp. Now repeat steps 1130-1170 on their own.

The following is another way to determine the seeked frame. Given ρ on the seek bar, besides determining α, also estimate ν the video frame number as the percentage position ρ in the video index file. Note adjustments may need to be made if there was no video for a while.

Send the audio and video stamps to AVSM. If the decision is to PLAY, use this frame. If the decision is to SKIP, then search forwards. If the decision is to WAIT, then search backwards. As before, if a SKIP is encountered, before a PLAY decision during this backward search, then change the decision to PLAY. If the beginning or end of the video file is reached, then do nothing. If a PLAY is determined, then check the frame type. If it is an I-frame, then it can be decoded and played. If it is a P frame, then we need to search backwards for the nearest I-frame and start decoding from there.

As with fast forward and rewind, an alternate approach to seek forward is to display all streams, not just that of the reference participant.

Seek Back

Seek back is similar to a combination of rewind and seek forward. The principles described for rewind and for seek forward can be combined to implement seek back.

Additional Considerations

There are many ways to implement playback methods. There are several advantages to the specific examples described above, including the following. First, videos of individual participants can be resized as desired. In addition, videos can be placed at different positions on a user's screen as desired. Audio and video settings can be individually adjusted. For example, the audio of participant A can be raised independent of other participants, or the contrast of participant B's video can be adjusted independent of other participants, or the brightness of participant B's video can be adjusted independent of other participants, etc. All the above settings can be saved by a user, so that the next time the call is played back by the user it is played at the desired settings. The recorded calls can be saved on the client machine or server. The settings can be saved with it and updated as desired. Yet other users who are given access to it can create their own custom settings.

The above examples make use of the AVSM of FIG. 3 to handle the playback and related features. In this example, the time stamps during capture are matched. If audio is not available then, preferably, during recording, silence is stored. Consider two cases. If video is available from the start, then the audio time stamp is assumed to be the same as the first video time stamp. If no video at the start, then the time stamp is set to the system time stamp or set arbitrarily. When video appears (without audio), the time stamp of the audio is set to that video frame time stamp. If video appears with audio, the audio time stamp is taken.

A virtual audio stream can also be used for synchronization purposes. In one approach, take the time stamp for the first video frame and set this to be the time stamp for the first audio frame. Now it is a simple calculation to keep incrementing the time stamp in any desired interval (for example 20 ms) and then matching to the video frame. While a virtual audio stream is easy to incorporate into the algorithms, its usage is a bit more complicated than the straightforward approach of using actual audio streams (silent or not).

Note the following points about the recording and playback. The process of decoding need not be done at the point described above; it can be done by the players themselves. That is the point where decoding is flexible. Any encoder and compatible decoder can be used for the audio and video. The audio and video can also be in raw format. Time information is required for the video and audio. It is preferable to create this during the capture process, but it can also be created before playback from the streams if available in full, or from additional data. Quick access to frame information for audio and/or video is preferred. This can be pre-generated or generated when the message is played. We referred to this as index files.

The present invention has been described in particular detail with respect to a limited number of embodiments. One skilled in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of the above description present the feature of the present invention in terms of algorithms and symbolic representations of operations on information. These algorithmic descriptions and representations are the means used by those skilled in the art to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CDs, DVDs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The figures depict preferred embodiments of the present invention for purposes of illustration only. One skilled in the art will readily recognize from the following discussion that alternative embodiments of the structures and methods illustrated herein may be employed without departing from the principles of the invention described herein.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

I claim:

1. A computer-implemented method for producing a video conference display for a receiver participant, the method comprising:
  receiving over a network one or more audio streams and one or more video streams from one or more sender participants, the audio streams divided into audio frames and the video stream(s) divided into video frames, wherein:
    each audio frame retains in the composite stream an audio time marker from a corresponding sender participant, and
    each video frame retains in a video stream a video time marker from a corresponding sender participant;
  generating and playing a composite audio stream based on the one or more audio streams;
  for each sender participant providing a video stream, matching playback of the video stream for each sender participant to the composite audio stream, the matching comprising:

repeatedly determining if a current frame of the video stream for a first sender participant should occur during a current audio frame of the composite audio stream by comparing the retained video time marker for the first sender participant to the retained audio time marker in the composite audio stream for the first sender participant:
  if the current video frame should occur during a time period calculated for the current audio frame for the first sender participant based on the retained audio time marker for that participant, then playing the current video frame and moving to a next frame of the video stream;
  if the current video frame should occur after said time period, then waiting; and
  if the current video frame should have occurred before said time period, then skipping the current video frame and moving to a next frame of the video stream.

2. The computer-implemented method of claim 1 wherein the step of determining if a current frame of the video stream for that sender participant should occur during a current audio frame of the composite audio stream comprises:
  determining whether a time stamp for the current video frame falls within a time tolerance of a time stamp for the current audio frame.

3. The computer-implemented method of claim 2 wherein two or more video streams are received from two or more sender participants.

4. A computer-implemented method for playback of a recorded video conference call between two or more participants, the method comprising:
  accessing one or more audio streams and one or more video streams from the participants, the audio streams divided into audio frames and the video stream(s) divided into video frames, wherein:
    each audio frame retains in the composite stream an audio time marker from a corresponding sender participant, and
    each video frame retains in a video stream a video time marker from a corresponding sender participant;
  generating and playing a playback audio stream based on the one or more audio streams;
  for each participant having provided a video stream, matching playback of the video stream for each participant to the playback audio stream, the matching comprising:
    repeatedly determining if a current frame of the video stream for a sender participant should occur during a current audio frame of the playback audio stream by comparing the retained video time marker for the first participant to the retained audio time marker in the playback audio stream for the sender participant:
      if the current video frame should occur during a time period calculated for the current audio frame for the first participant based on the retained audio time marker for that participant, then playing the current video frame and moving to a next frame of the video stream;
      if the current video frame should occur after said time period, then waiting; and
      if the current video frame should have occurred before said time period, then skipping the current video frame and moving to a next frame of the video stream.

5. The computer-implemented method of claim 4 further comprising:
  during a fast forward mode:
    advancing the audio time stamp faster than real-time; and
    performing, for the video stream of only one of the participants, the step of determining if a current frame of the video stream for that participant should occur during a current audio frame; and
  after the fast forward mode, synchronizing the video streams of the other participants to the time stamp of the current audio frame.

6. The computer-implemented method of claim 4 further comprising:
  during a fast forward mode:
    advancing the audio time stamp faster than real-time; and
    performing, for the video streams of all participants, the step of determining if a current frame of the video stream for that participant should occur during a current audio frame.

7. The computer-implemented method of claim 4 further comprising:
  during a rewind mode:
    advancing the audio time stamps in a reverse direction; and
    performing, for the video stream of only one of the participants, the step of determining if a current frame of the video stream for that participant should occur during a current audio frame; and
  after the rewind mode, synchronizing the video streams of the other participants to the time stamp of the current audio frame.

8. The computer-implemented method of claim 4 further comprising:
  during a rewind mode:
    advancing the audio time stamps in a reverse direction; and
    performing, for the video streams of all participants, the step of determining if a current frame of the video stream for that participant should occur during a current audio frame.

9. The computer-implemented method of claim 4 further comprising:
  during a seek mode:
    changing the audio time stamp to a seek location; and
    synchronizing the video time stamps for the video streams to the audio time stamp of the seek location.

10. The computer-implemented method of claim 9 wherein the step of synchronizing the video time stamps comprises stepping through the video time stamps until the video time stamps are synchronized with the audio time stamp of the seek location.

11. The computer-implemented method of claim 9 wherein the step of synchronizing the video time stamps comprises using a binary search to synchronize the video time stamps with the audio time stamp of the seek location.

12. The computer-implemented method of claim 4 further comprising setting a video time stamp=NULL to indicate moving to a next video frame.

13. The computer-implemented method of claim 4 wherein the audio streams and the video streams are indexed, and the indices are used during irregular playback.

14. The computer-implemented method of claim 4 wherein a look ahead technique is used during irregular playback.

15. The computer-implemented method of claim 4 further comprising adjusting the number of video streams played during irregular playback based on the compute resources available for playback.

16. The computer-implemented method of claim 4 wherein there are two or more audio streams received from two or more participants, and the audio streams are synchronized relative to each other.

17. A computer-implemented method for synchronizing an audio stream and a video stream, the method comprising:
playing the audio stream as a series of audio chunks, each audio chunk retaining an audio time marker from a corresponding sender of the audio stream and the video stream;
matching playback of a video frame of the video stream from the sender to an audio chuck of the audio stream from the sender, the current frame of the video stream retaining a video time marker from the sender of the audio stream and the video stream, the matching comprising:
determining if a current frame of the video stream should occur during the playing of a current audio chunk by comparing the retained video time marker for the sender participant to the retained audio time marker for the sender participant:
if the current video frame should occur during a time period calculated for the current audio chunk, then playing the current video frame and moving to a next frame of the video stream;
if the current video frame should occur after said time period, then waiting; and
if the current video frame should have occurred before said time period, then skipping the current video frame and moving to a next frame of the video stream.

18. The computer-implemented method of claim 17 wherein the step of determining if a current frame of the video stream should occur during the playing of a current audio chunk comprises:
determining a time marker for the current video frame;
determining a start time and an end time for the time period calculated for the audio chunk; and
determining whether the time marker falls between the start time and the end time.

19. The computer-implemented method of claim 17 wherein the step of determining a start time and an end time comprises:
determining a nominal start time and a nominal end time for the audio chunk;
adjusting the nominal start time by a tolerance; and
adjusting the nominal end time by another tolerance.

20. A video conference call client for synchronizing and mixing audio and video streams received over a network from one or more sender participants, the video conference call client comprising:
an audio player module, for playing a composite audio stream based on one or more audio streams received from sender participants, each audio frame of the one or more audio streams retaining in the composite stream an audio time marker from a corresponding sender participant;
a video player module, for playing one or more video streams received from sender participants, each video frame of each video stream retaining a video time marker from a corresponding sender participant; and
an audio-video synchronization module for synchronizing the video streams to the audio stream, the synchronizing comprising:
comparing the retained video time marker for a first sender participant to the retained audio time marker in the composite audio stream for the first sender participant:
if the current video frame should occur during a time period calculated for the current audio frame, then playing the current video frame and moving to a next frame of the video stream;
if the current video frame should occur after said time period, then waiting; and
if the current video frame should have occurred before said time period, then skipping the current video frame and moving to a next frame of the video stream.

21. A video conference call client for playback of a recorded video conference call between two or more participants, the video conference call client comprising:
an audio player module, for playing one or more audio streams from the participants;
a video player module, for playing one or more video streams from the participants; and
an audio-video synchronization module for synchronizing the video streams to the audio streams, wherein the audio streams are divided into audio frames and the video stream(s) are divided into video frames, wherein:
each audio frame retains an audio time marker from a corresponding sender participant, and
each video frame retains in a video stream a video time marker from a sender participant; and
for each sender providing a video stream, the audio-video synchronization module matching playback of a current frame of the video stream for each sender participant to a current audio frame for the corresponding sender participant, wherein the audio-video synchronization module:
repeatedly determines if a current frame of the video stream for that participant should occur during a current audio by comparing a retained video time marker for the current frame of the video stream to the current frame of the audio stream for that sender participant:
if the current video frame should occur during a time period calculated for the current audio frame, then playing the current video frame and moving to a next frame of the video stream;
if the current video frame should occur after said time period, then waiting; and
if the current video frame should have occurred before said time period, then skipping the current video frame and moving to a next frame of the video stream.

* * * * *